United States Patent
Todd

(10) Patent No.: US 7,281,108 B2
(45) Date of Patent: *Oct. 9, 2007

(54) METHOD AND APPARATUS FOR MANAGING MIGRATION OF DATA IN A COMPUTER SYSTEM

(75) Inventor: Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/438,975

(22) Filed: May 23, 2006

(65) Prior Publication Data

US 2006/0212671 A1  Sep. 21, 2006

Related U.S. Application Data

(63) Continuation of application No. 10/315,472, filed on Dec. 10, 2002, now Pat. No. 7,080,225.

(51) Int. Cl.
*G06F 12/00* (2006.01)

(52) U.S. Cl. ............... 711/165; 711/5; 711/6; 711/154; 711/161; 711/162

(58) Field of Classification Search ............ None
See application file for complete search history.

(56) References Cited

U.S. PATENT DOCUMENTS

| | | | |
|---|---|---|---|
| 5,857,208 A | 1/1999 | Ofek | |
| 6,209,002 B1 | 3/2001 | Gagne et al. | |
| 6,401,178 B1 | 6/2002 | Gagne et al. | |
| 6,529,944 B1 | 3/2003 | LeCrone | |
| 6,549,921 B1 | 4/2003 | Ofek | |
| 6,581,143 B2 | 6/2003 | Gagne et al. | |
| 6,687,718 B2 | 2/2004 | Gagne et al. | |

*Primary Examiner*—Reginald Bragdon
*Assistant Examiner*—Mehdi Namazi
(74) *Attorney, Agent, or Firm*—Wolf, Greenfield & Sacks, P.C.

(57) ABSTRACT

Methods and apparatus for migrating a data set. In one embodiment, a migration is paused. In another embodiment, for a migration of data between multiple source/target groups, the migration is initiated by beginning transfer for some groups and queuing others for later processing. In a further embodiment, different transfer vehicles are used for different source/target groups. In a still further embodiment, a transfer vehicle is automatically selected for at least one source/target group.

47 Claims, 11 Drawing Sheets

METHOD AND APPARATUS FOR MANAGING MIGRATION OF DATA IN A COMPUTER SYSTEM

RELATED APPLICATIONS

This application is a continuation of prior application Ser. No. 10/315,472, filed Dec. 10, 2002 now U.S. Pat. No. 7,080,225, issued on Jul. 18, 2006, entitled METHOD AND APPARATUS FOR MANAGING MIGRATION OF DATA IN A COMPUTER SYSTEM, which is incorporated herein by reference.

FIELD OF THE INVENTION

This invention relates generally to the field of computer systems, and more particularly to methods and apparatus for migrating data in a computer system.

DESCRIPTION OF THE RELATED ART

Many computer systems include one or more host computers, and one or more storage systems that store data used by the host computers. An example of such a computer system including a host computer 1 and two storage systems 3 and 4 is shown in FIG. 9.

The storage systems 3, 4 include a plurality of disk drives (5a-5b or 6a-6b) and a plurality of disk controllers (7a-7b or 8a-8b) that respectively control access to the disk drives. A plurality of storage bus directors (9, 10) control communication with host computer 1 over communication buses (17, 18). Each storage system 3, 4 further includes a cache 11, 12 to provide improved storage system performance. In particular, when the host computer 1 executes a read from one of the storage systems 3, 4, the storage system may respond to the read from its cache 11, 12 (when the data is stored in the cache), rather than from one of the disk drives 5a-5b or 6a-6b, in order to execute the read more efficiently. Similarly, when the host computer 1 executes a write to one of the storage systems 3, 4, corresponding storage bus directors 9,10 can perform the write to the cache 11, 12. Thereafter, the data can be de-staged asynchronously in a manner transparent to the host computer 1, to the appropriate one of the disk drives 5a-5b, 6a-6b. Finally, storage systems 3, 4 include internal buses 13, 14 over which storage bus directors 9, 10, disk controllers 7a-7b, 8a-8b and caches 11, 12 communicate.

The host computer 1 includes a processor 16 and one or more host bus adapters 15 that each controls communication between the processor 16 and one of the storage systems 3, 4 via a corresponding one of the communication buses 17, 18. It should be appreciated that rather than a single processor 16, host computer 1 can include multiple processors. Each bus 17, 18 can be any of a number of different types of communication links, with the host bus adapter 15 and storage bus directors 9, 10 being adapted to communicate using an appropriate protocol for the communication buses 17, 18 coupled therebetween. For example, each of the communication buses 17, 18 can be implemented as a SCSI bus with the directors 9, 10 and adapters 15 each being a SCSI driver. Alternatively, communication between the host computer 1 and the storage systems 3, 4 can be performed over a Fibre Channel fabric.

Typically, the storage systems 3,4 make storage resources available to the host computer for assignment to entities executing on the host, such as a file system, database manager or logical volume manager. If the storage systems are so-called "dumb" storage devices, the storage resources made available to the host computer will correspond in a one-to-one relationship to physical storage devices within the storage systems. However, when the storage systems are intelligent storage systems, they will present "logical volumes" of storage to the host computer that need not necessarily correspond to a single physical storage devices within the storage system, as the intelligent storage systems may map each logical volume of storage presented to the host across one or more physical storage devices or portions thereof.

Administrators of computer systems like that depicted in FIG. 9 often find it desirable to migrate a set of logically related data, such as a database or file system, from one storage location to another, such as from storage system 3 to storage system 4. One reason for this may be that a data set is expanding at such a rate that it will soon exceed the storage capacity of a device. Other common reasons include the administrator's desire to move the data set to a device with faster response time, to physically relocate the data to one or more other devices to facilitate faster access on those devices, to establish a different disk striping scheme for fault tolerance and/or performance purposes, and/or to optimize the geographic location where the data set is physically stored. This list is not exhaustive, as there may be many other reasons to migrate a data set.

Data migrations are often complex and problematic exercises for several reasons. First, administrators usually must take any applications which access the data offline. Depending on the size of the data set (which usually determines the time required to move it), applications can be offline for lengthy periods, leading to a loss of productivity and opportunity cost associated with not having data available to support important business functions. Second, a single data migration often consists of a number of smaller data migrations, since a data set is typically broken into subsets dispersed across a number of "source" devices. These subsets need to be moved to a number of "target" devices, often requiring significant coordination. Third, data migrations usually require a substantial amount of manual labor, and are therefore error-prone, costly and involve redirecting resources from other functions to the migration.

SUMMARY OF THE INVENTION

In one embodiment, a method is provided for migrating a data set stored on at least one source storage resource to at least one target storage resource in a computer system, the method comprising acts of (A) beginning a migration of the data set by transferring a first portion of the data set from the at least one source storage resource to the at least one target storage resource, (B) pausing at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and (C) resuming the migration by transferring the second portion of the data set from the at least one source storage resource to the at least one target storage resource without re-transferring at least a subset of the first portion of the data set.

In another embodiment, a method is provided for controlling a migration of a data set stored on at least one source storage resource to at least one target storage resource in a computer system, the method comprising acts of (A) initiating a migration of the data set so that a first portion of the data set is transferred from the at least one source storage resource to the at least one target storage resource, (B) pausing at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and (C) resuming the migration so that the second portion of the data set is transferred from the at least one source storage resource to the at least one target storage resource without re-transferring at least a subset of the first portion of the data set.

In yet another embodiment, a computer-readable medium having instructions recorded thereon is provided for performing a method of migrating a data set stored on at least one source storage resource to at least one target storage resource in a computer system. The method comprises acts of (A) beginning a migration of the data set by transferring a first portion of the data set from the at least one source storage resource to the at least one target storage resource, (B) pausing at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and (C) resuming the migration by transferring the second portion of the data set from the at least one source storage resource to the at least one target storage resource without re-transferring at least a subset of the first portion of the data set.

In still another embodiment, a computer-readable medium having instructions recorded thereon is provided for performing a method of controlling a migration of a data set stored on at least one source storage resource to at least one target storage resource in a computer system. The method comprises acts of (A) initiating a migration of the data set so that a first portion of the data set is transferred from the at least one source storage resource to the at least one target storage resource, (B) pausing at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and (C) resuming the migration so that the second portion of the data set is transferred from the at least one source storage resource to the at least one target storage resource without re-transferring at least a subset of the first portion of the data set.

In still another embodiment, an apparatus is provided for migrating a data set stored on at least one source storage resource to at least one target storage resource in a computer system. The apparatus comprises at least one processor that is programmed to begin a migration of the data set by transferring a first portion of the data set from the at least one source storage resource to the at least one target storage resource, pause at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and resume the migration by transferring the second portion of the data set from the at least one source storage resource to the at least one target storage resource without re-transferring at least a subset of the first portion of the data set.

In still another embodiment, an apparatus is provided for migrating a data set stored on at least one source storage resource to at least one target storage resource in a computer system. The apparatus comprises at least one processor that is programmed to initiate a migration of the data set so that a first portion of the data set is transferred from the at least one source storage resource to the at least one target storage resource, pause at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource, and resume the migration so that the second portion of the data set is transferred from the at least one source storage resource to the at least one target storage resource without re-transferring at least a subset of the first portion of the data set.

In still another embodiment, a method is provided for initiating a migration of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources. The method comprises acts of (A) beginning an active transfer of data, for each of a first set of the plurality of groups, from the source storage resource to the at least one target storage resource, and (B) queuing, for later processing, a second set of the plurality of groups, so that an active transfer of data for the second set of the plurality of groups is not begun at a same time as for the first set of the plurality of groups.

In still another embodiment, an apparatus is provided for migrating a data set from a plurality of source storage resources to a plurality of target storage resources, wherein each one of the source storage resources forms a group with a corresponding at least one target storage resource to which data on the one of the source storage resources will be migrated, and wherein the migration involves a plurality of groups of source and target storage resources. The apparatus comprises at least one processor that is programmed to begin an active transfer of data, for each of a first set of the plurality of groups, from the source storage resource to the at least one target storage resource, and queue, for later processing, a second set of the plurality of groups, so that an active transfer of data for the second set of the plurality of groups is not begun at a same time as for the first set of the plurality of groups.

Another embodiment is directed to a computer-readable medium having instructions recorded thereon for performing a method of initiating a migration of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources. The method comprises acts of (A) beginning an active transfer of data, for each of a first set of the plurality of groups, from the source storage resource to the at least one target storage resource, and (B) queuing, for later processing, a second set of the plurality of groups, so that an active transfer of data for the second set of the plurality of groups is not begun at a same time as for the first set of the plurality of groups.

In still another embodiment, a method is provided for performing a migration of a data set from a plurality of source storage resources to a plurality of target storage resources in a computer system, each one of the source storage resources forming a group with a corresponding at least one target storage resource to which data on the one of the source storage resources will be migrated, the migration involving a plurality of groups of source and target storage resources including at least first and second groups. The method comprises acts of (A) transferring data for the first group from the source storage resource in the first group to the at least one target storage resource in the first group using a first transfer vehicle, and (B) transferring data for the second group from the source storage resource in the second group to the at least one target storage resource in the second group using a second transfer vehicle that is of a different type than the first transfer vehicle.

Another embodiment is directed to a computer-readable medium having instructions recorded thereon for performing a method of migrating a data set from a plurality of source storage resources to a plurality of target storage resources in a computer system, each one of the source storage resources forming a group with a corresponding at least one target storage resource to which data on the one of the source storage resources will be migrated, the migration involving a plurality of groups of source and target storage resources including at least first and second groups. The method comprises acts of (A) transferring data for the first group from the source storage resource in the first group to the at least one target storage resource in the first group using a first transfer vehicle, and (B) transferring data for the second group from the source storage resource in the second group to the at least one target storage resource in the second group using a second transfer vehicle that is of a different type than the first transfer vehicle.

In still another embodiment, an apparatus is provided for migrating a data set from a plurality of source storage resources to a plurality of target storage resources in a computer system, each one of the source storage resources forming a group with a corresponding at least one target storage resource to which data on the one of the source storage resources will be migrated, the migration involving a plurality of groups of source and target storage resources including at least first and second groups. The apparatus comprises at least one processor that is programmed to transfer data for the first group from the source storage resource in the first group to the at least one target storage resource in the first group using a first transfer vehicle, and transfer data for the second group from the source storage resource in the second group to the at least one target storage resource in the second group using a second transfer vehicle that is of a different type than the first transfer vehicle.

In still another embodiment, a method is provided for initiating a migration of a data set from at least one source storage resource to at least one target storage resource in a computer system, the computer system comprising at least one transfer vehicle capable of transferring data from the at least one source storage resource to the at least one target storage resource. The method comprises an act of submitting a request to at least one agent to initiate the migration of the data set and to select a transfer vehicle to perform the transfer of data from the at least one source storage resource to the at least one target storage resource.

In still another embodiment, a method is provided for use in connection with a migration of a data set from at least one source storage resource to at least one target storage resource in a computer system, the computer system comprising at least one transfer vehicle capable of transferring data from the at least one source storage resource to the at least one target storage resource. The method comprises a computer-implemented act of, in response to a request to perform the migration of the data set, automatically selecting at least one transfer vehicle to perform the transfer of at least a portion of the data set from the at least one source storage resource to the at least one target storage resource.

Another embodiment is directed to a computer-readable medium having instructions recorded thereon for performing a method of initiating a migration of a data set from at least one source storage resource to at least one target storage resource in a computer system, the computer system comprising at least one transfer vehicle capable of transferring data from the at least one source storage resource to the at least one target storage resource. The method comprises an act of submitting a request to at least one agent to initiate the migration of the data set and to select a transfer vehicle to perform the transfer of data from the at least one source storage resource to the at least one target storage resource.

Still another embodiment is directed to a computer-readable medium having instructions recorded thereon for migrating a data set from at least one source storage resource to at least one target storage resource in a computer system, the computer system comprising at least one transfer vehicle capable of transferring data from the at least one source storage resource to the at least one target storage resource. The method comprises an act of, in response to a request to perform the migration of the data set, automatically selecting at least one transfer vehicle to perform the transfer of at least a portion of the data set from the at least one source storage resource to the at least one target storage resource.

In still another embodiment, an apparatus is provided for initiating a migration of a data set from at least one source storage resource to at least one target storage resource in a computer system, the computer system comprising at least one transfer vehicle capable of transferring data from the at least one source storage resource to the at least one target storage resource. The apparatus comprises at least one processor that is programmed to submit a request to at least one agent to initiate the migration of the data set and to select a transfer vehicle to perform the transfer of data from the at least one source storage resource to the at least one target storage resource.

Finally, in still another embodiment, an apparatus is provided for migrating a data set from at least one source storage resource to at least one target storage resource in a computer system, the computer system comprising at least one transfer vehicle capable of transferring data from the at least one source storage resource to the at least one target storage resource. The apparatus comprises at least one processor that is programmed to, in response to a request to perform the migration of the data set, automatically select at least one transfer vehicle to perform the transfer of at least a portion of the data set from the at least one source storage resource to the at least one target storage resource.

DETAILED DESCRIPTION

Figure 1:
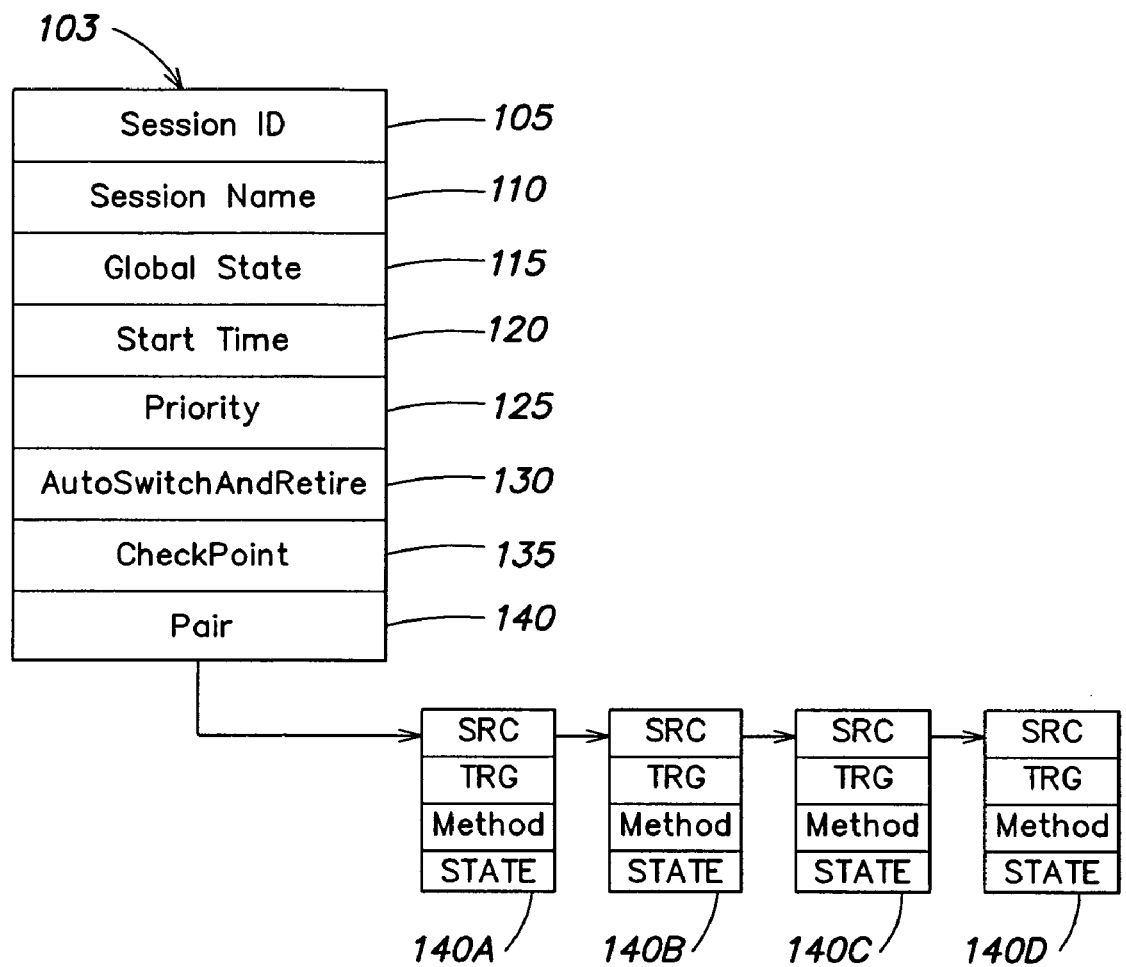
FIG. 1 depicts a data structure employed by one embodiment of the invention to supply migration session parameters and state information.

Several embodiments of the present invention are directed to improved methods and apparatus for migrating data in a computer system.

In accordance with one embodiment, aspects of the present invention can be employed with migrations in which the data set being migrated (e.g., copied or moved) need not be taken offline during the migration. Such a migration can occur "in the background" while normal application processing proceeds. An example of a technique for performing an on-line migration is described in commonly assigned co-pending application Ser. No. 10/122,556, entitled "Method and Apparatus for Managing Access to Volumes of Storage," which is incorporated herein by reference. In one embodiment described therein, after the migration is complete, I/O requests are automatically "redirected" from the source locations of the migration to the target locations, so that they access data in its new location. This can be done transparently to the applications that access the data, so those applications need not be taken offline. This technique is mentioned herein only as an example, as the aspects of the present invention applicable to on-line migrations can be employed with any on-line migration technique.

In accordance with another embodiment of the invention, a tool is provided to more effectively control migration processes. As noted above, data migrations can often be costly and error-prone exercises. One reason for this is that migrations can be "black box" processes, whose results can only be verified after completion, and which, after initiation, can only either proceed to completion or be aborted. There is typically no opportunity to control a migration while it is in progress. Accordingly, one embodiment of the invention provides the ability to control a data migration in progress.

In one embodiment, the ability is provided to pause and restart a migration. This can be advantageous for several reasons. First, if overall system performance suffers because a migration occupies an inordinate amount of processing resources, the migration can be paused and restarted at a more opportune time (e.g., during off-hours). Second, an administrator might pause a migration, adjust one or more parameters defining its execution, and restart it. Thus, if the migration is proceeding in an undesired manner, it can be adjusted midstream.

In accordance with one embodiment of the invention, the ability is provided to regulate the impact the migration has on overall performance of the computer system. This regulation may be accomplished in numerous ways. In one example, because a data set being migrated may comprise multiple data segments dispersed across multiple storage resources (e.g., physical devices and/or storage volumes, as discussed below), a migration may comprise movement of data between multiple discrete source/target pairs, and the regulation of the migration's impact on system performance may be accomplished by providing a maximum number of simultaneously active source/target pair transfers. In this embodiment, each source/target pair may be initially processed all at once, but once the maximum number of transfers has been reached, the remaining pairs may be queued so that the transfer of data does not begin for the queued pairs until one or more of the previous transfers are complete. Other embodiments may provide the ability to regulate the migration's impact on system performance by limiting the total amount of data being transferred at once, the amount of data transferred at once by an individual transfer vehicle (e.g., a particular host), or using other measures. In one embodiment, regulation parameters may be adjusted while the migration is in progress to speed it up or slow it down as circumstances dictate. For example, a user may increase the total amount of data that can be transferred at once to accelerate a migration during business off-hours.

In another embodiment, the resources assigned to a migration can be controlled by assigning a processing "priority" to the migration. The priority may define how processing resources on the host are assigned to the migration in relation to other processes. In this manner, a migration can be expedited by assigning it a higher priority, or if the migration is not a high priority it can be processed in a manner that minimizes the impact on system resources. In one embodiment, the priority may be adjusted while a migration is in progress.

In certain computer system configurations, numerous migration methods (i.e., transfer vehicles) may exist for transferring data between one or more source/target pairs. These include, but are not limited to, host-based procedures, storage system-based procedures (e.g., hardware mirroring facilities), and networking component-based procedures. Applicants have appreciated that it may be desirable to employ different migration methods for different source/target pairs in a single migration session. Thus, unlike conventional migrations which are limited to one migration method to move the entire data set, one embodiment of the invention provides the ability to choose different migration methods for source/target pairs in a same data set. The migration method for each source/target pair can be specified by a user, or, in one embodiment, the system can automatically pick a migration method for one or more source/target pairs. The choice of a migration method (by a user or automated process) can be made based on any of numerous factors. For example, the selection may seek to minimize the impact on system performance, by utilizing certain data transfer utilities when possible (e.g., a storage-to-storage hardware mirror facility, or an LVM replication capability).

In one embodiment, the migration of a data set, which can be any collection of data whether logically related (e.g., a file, database, file system or other collection of data) or not, is managed by creating a migration "session," through which the migration of data for each source/target pair is facilitated. Each source and target may comprise any of numerous types of storage resources, such as a LUN, a "disk" presented by a storage system, a physical storage device, a logical volume presented by a logical volume manager (LVM) or some other storage resource. The correspondence between sources and targets need not be one-to-one, as data on a source volume may be transferred to multiple targets, and the data from multiple sources may be transferred to a single target.

In one embodiment, the ability is provided to initiate a migration upon the occurrence of a predefined event. A predefined event may comprise a predetermined time interval, start time, or other event. In addition, a migration may involve the movement of data from one location to another, or the copying of data to another location. For example, a migration may be initiated to produce one or more copies of a data set at predefined intervals, so that "point-in-time" snapshots of the data set are created. Such snapshots may be useful for error recovery, to enable more efficient distributed access to the data set, or to satisfy other needs.

In one embodiment, a migration is controlled by a data mobility agent. The data mobility agent may be software-based, and may execute on a host computer or on any other device in a computer system. However, the invention is not limited in this respect, as the agent may comprise any suitably adapted hardware and/or software-based component(s). In one embodiment, an agent employs one or more application programming interfaces (APIs) which allow it to communicate with, and control the functions of, various external utilities as discussed below. For example, APIs may allow an agent to invoke a host-based copy procedure or any other transfer method supported by the computer system on which the migration occurs. APIs may also be provided which allow external entities to control the agent's functions. For example, in one embodiment, the agent's functions are coordinated by a management tool, such as the Control Center/Open Edition suite offered by EMC Corporation (hereinafter the ECC management tool), which may perform complementary functions to those described herein, including determining the various locations at which a given body of data resides, provisioning devices to store the data and configuring network equipment to enable secure data transmission. However, the present invention is not limited in this respect, as the agent can control, and be controlled by, other processes in numerous other ways.

In one embodiment, the agent communicates with other resources on the computer system to control the transfer of data and perform related functions. For example, an agent may directly invoke the functions of a migration method (e.g., a host-based copy routine, a storage system-to-storage system routine, and/or others) on the system.

In one embodiment, instructions are presented to the agent in a data structure which provides operational parameters for the migration session and each source/target pair. The characteristics and function of an illustrative data structure are discussed in detail below.

In one embodiment, the agent utilizes a data repository to store and retrieve data related to the migration session. The repository may provide data useful for ascertaining the state of various entities involved in a migration, for recovering from system malfunctions, and other purposes. The repository may be a database, file, or other data set (i.e., a collection of data), and need not be centralized in a single store. In one embodiment, the repository may only be accessed and/or updated by one or more agents, but the invention is not limited in this regard, as other embodiments may provide for repository access and/or update by other processes executing on the system.

I. The Data Structure

As discussed above, in one embodiment the agent's operation, and thus the migration, is controlled in part by parameters specified in a data structure submitted to the agent to define the migration. The data structure may be created based on a user's input to any suitably adapted input facility (e.g., a GUI, command line interface, or other input tool). While a data structure serves as one of the primary modes of communication between user and agent, the invention is not limited in this respect as other communication/input tools may be employed.

In one embodiment, a separate data structure defines the parameters for each migration session. Of course, the invention is not limited in this respect, as a single data structure could provide parameters for multiple migration sessions.

In one embodiment, the data structure provides not only parameters for an overall migration session, but also separate parameters for individual source/target pairs. As discussed above, a migration session may comprise the movement of data between a number of discrete source/target pairs. Thus, providing separate parameters for each source/target pair allows an administrator to specify different migration methods for each source/target pair, ascertain the individual status of each source/target pair, and otherwise separately control and monitor individual source/target pairs. However, the invention is not limited in this regard, as separate parameters need not be provided for all individual source/target pairs. Furthermore, a migration session may comprise a single source/target pair.

The data structure may take any desirable form (e.g., relational structure, hierarchical structure, flat file, object-oriented or other form).

An illustrative form for the data structure is depicted in FIG. 1. As discussed in more detail below, this data structure serves the dual purpose of providing input to the agent to control aspects of a migration session, and also allows the agent to provide status regarding a previously initiated migration session. In this respect, in one embodiment, when the agent receives the data structure, it loads the migration parameters provided therein into the data repository. When the agent is queried to determine the status of an ongoing migration session, in one embodiment the agent recreates the data structure based on the most current data in the repository, and returns the updated data structure (e.g., to the user interface). It should be appreciated, however, that the invention is not limited to employing the same data structure as an input to and output from the agent, as different structures may be used for these purposes. Also, the particular fields and format of the data structure shown in FIG. 1 are merely illustrative, as the invention is not limited in this respect.

Referring to FIG. 1, the data structure 103 includes a session ID 105, which is an identifier for the migration session. The session ID may be an alphanumeric string, although it is not limited to any particular format. The identifier performs several functions. First, it creates a logical entity to which a number of underlying source/target pairs can be related. Second, it allows each migration session to be tracked independently, even after completion. Third, it attaches a unique identity to each migration session, so that if multiple migration sessions proceed simultaneously, each can be uniquely identified and coordinated separately. The identifier may be assigned by any entity in the computer system that can ensure the creation and assignment of unique identifiers for each migration session. For example, where the computer system includes a management tool (such as the above-discussed ECC management tool), the identifiers may be assigned by that management tool. Alternatively, in a system which includes multiple agents, one agent may be assigned to function as a "master" to assign session identifiers for the system, or any other entity may be chosen to perform this function.

The data structure 103 also includes a session name 110 that is a descriptor for the migration session. The descriptor may be an alphanumeric string supplied by a user to associate a more descriptive user-recognizable name to the session than that provided by the session ID. For example, if a particular database is to be migrated, an administrator may use the name of that database as the session name 110. The session name eliminates the need for a user to memorize a session identifier in order to recognize a particular session, and can provide a meaningful description that facilitates recognition of what the session entails. The session name 110 may also prove especially useful in providing an enduring record of past migration sessions.

The data structure 103 further includes a global state field 115 for the migration session's global state. This field 115 may not be populated when the data structure is submitted to initiate the session, but can be used when the agent presents the data structure to report on the status of the session. As discussed below, in the embodiment of FIG. 1, the agent ascertains the state (i.e., status) of each source/target pair migration. If queried about the status of the overall migration session, the agent may aggregate source/target pair status indications to determine a global state for the migration session. The aggregation and characterization of global state may be performed in any of a number of ways, as the invention is not limited in this respect. Examples of the migration status types that can be provided in the global status field 115 are discussed below.

The data structure 103 also stores an indication of the start time 120 of the migration session. In one embodiment, this reflects when the agent received the request to begin the migration. This indication may be useful in numerous ways. For example, the start time indication may allow the agent to calculate the duration of an ongoing migration session. This may be useful for limiting a migration session to a certain maximum elapsed time. Using this capability (e.g., in conjunction with the priority indicator discussed below), a user may prevent a migration session from occupying system resources over an extended period, keep a session from exceeding a predetermined time window (e.g., if a user wants a migration to process only during non-business hours), or otherwise control the timing of the migration. The start time indication may also be useful in resolving conflicts between migration sessions. For example, in one embodiment discussed below, an agent may begin a migration session by first determining whether any source/target pairs comprising the session are "locked" by another session. If two migration sessions simultaneously seek to access a particular device, the conflict may be resolved by determining which migration session started earliest. The start time indication may also be useful in that it may specify a later start time for the migration. For example, an administrator might use the start time indication to specify that the migration should begin during business off-hours. The examples above are provided for illustrative purposes only, as the uses of the start time indication are not limited to those listed.

The data structure 103 also has a priority field 125 which defines the relative priority assigned to the migration session. The priority field provides input to the agent as to the amount of processing resources to be allocated to the migration session. The priority/resource control can be implemented in any of numerous ways. For example, the agent may communicate directly with the host operating system to influence resource distribution. Alternatively, in one embodiment the agent uses the priority to determine the quantity of resources to take for itself by altering the resource-intensiveness of the migration process. For example, the priority may instruct the agent how long to wait between issuing transfer (e.g., copy) commands, how many memory buffers to employ, how large each buffer should be, a total duration for the migration session, or provide any other type of information that impacts resource usage. The priority may be set by a user, management tool, or other entity. In one embodiment, the priority may be modified while a migration session is in progress (e.g., by an administrator submitting an updated data structure to the agent with a modified entry in the priority field) so the user can "throttle" the migration as circumstances dictate.

The data structure 103 includes an auto-switch and retire field 130 that indicates whether the agent should perform an "auto-switch" and/or retirement at the completion of the migration session. This field is provided for use with a migration process that can automatically (i.e., without reconfiguring the host) redirect host accesses from the source to the target. An example of such a migration process is described in the above-referenced application Ser. No. 10/122,556. The embodiment of the invention that includes the auto-switch and retire field 130 is not limited to use with this particular migration process, and can be used with any migration process having this capability. Furthermore, the invention is not limited to use with migration processes having this capability, as the auto-switch and retire field is optional.

The timing of the switch to the target can be controlled by the auto-switch and retire field 130, with any of several options. For example, the field 130 can specify that the switch be performed at a predetermined time, upon a predetermined event (e.g., when the business day concludes), when the migration is completed, on an individual source/target pair basis as each pair is completed, or any other desired circumstance. The retire option relates to rendering the source location inaccessible after a switch is completed, for any number of reasons, examples of which are discussed in the above-referenced application Ser. No. 10/122,556. In one embodiment, the migration process may allow a migration to be "undone" if it was unsuccessful in some respect, so source retirement may not be desired in all circumstances. Accordingly, the auto-switch and retire field 130 may support specifying that automatic switching be performed, but that retirement not be performed.

The auto-switch indication may be initially set by a user, by a management tool, or other entity. In one embodiment, the auto-switch indication may be modified while a migration session is in progress. The auto-switch process is discussed in further detail below with reference to FIG. 2.

The data structure 103 further includes a checkpoint field 135 which indicates whether the agent should track the progress of the migration so that if the migration is interrupted by the failure of any component in the system, the migration can be restarted from the point of failure. This field is intended for use with a migration process that has the capability to log the state of a migration and restart it in the event of an interruption. One example of such a migration process is described in co-pending commonly assigned application Ser. No. 10/211,469, entitled "Migration Host-Based Mirroring," which is incorporated herein by reference. However, the present invention is not limited to use with this migration process, as other techniques may be employed to log the state of a migration and resume from a point of failure, and aspects of the present invention can be employed with migration techniques that do not have this capability. Use of the checkpoint field may be advantageous because it provides an administrator control over whether such logging is performed, thereby preventing the unnecessary consumption of system resources if such logging is not desired.

Finally, the data structure 103 includes one or more pair tables or fields 140A-D, each of which includes information on one of the source/target pairs in the migration session. In the embodiment shown in FIG. 1, four tables are shown and each identifies the corresponding source and target, the method to be used to move the data from the source to the target, and the state of the migration for the source/target pair. However, the invention is not limited to providing this information for any specific number of source/target pairs, as the number of tables or fields may range from one to any suitable number. Further, the invention is not limited to providing the specific information shown, as different sets of information are possible.

As discussed above, the sources and targets involved in the migration may be any of various types of storage resources, examples of which include "disks" or LUNs provided by a storage system, actual physical storage devices, and logical volumes specified by a logical volume manager (LVM). The migration method suitable for a source/target pair may depend, in part, on the types of storage resources. For example, a hardware mirroring option for LUNs from one storage system to another may only be available when the computer system on which the source and target are provided supports such a facility, and a mirroring utility provided by an LVM may only be available as the migration method when the source and target are logical volumes managed by the LVM. In one embodiment discussed below, the data structure 103 can specify the migration method for each source/target pair (e.g., it can be selected by an administrator) or the data structure can instruct the agent to choose a migration method for one or more source/target pairs.

II. Agent Operation

In one embodiment, the agent performs a number of processes, including starting a migration session, pausing and restarting a migration session, canceling a migration session, facilitating auto-switching and retirement, and a wakeup process. This embodiment is merely illustrative, as the agent is not limited to performing these processes, and other implementations of the agent are possible. Similarly, although an illustrative implementation of each process is described below, the invention is not limited to these implementations, as each process can be implemented differently.

A. Starting A Migration Session

Figure 2A:
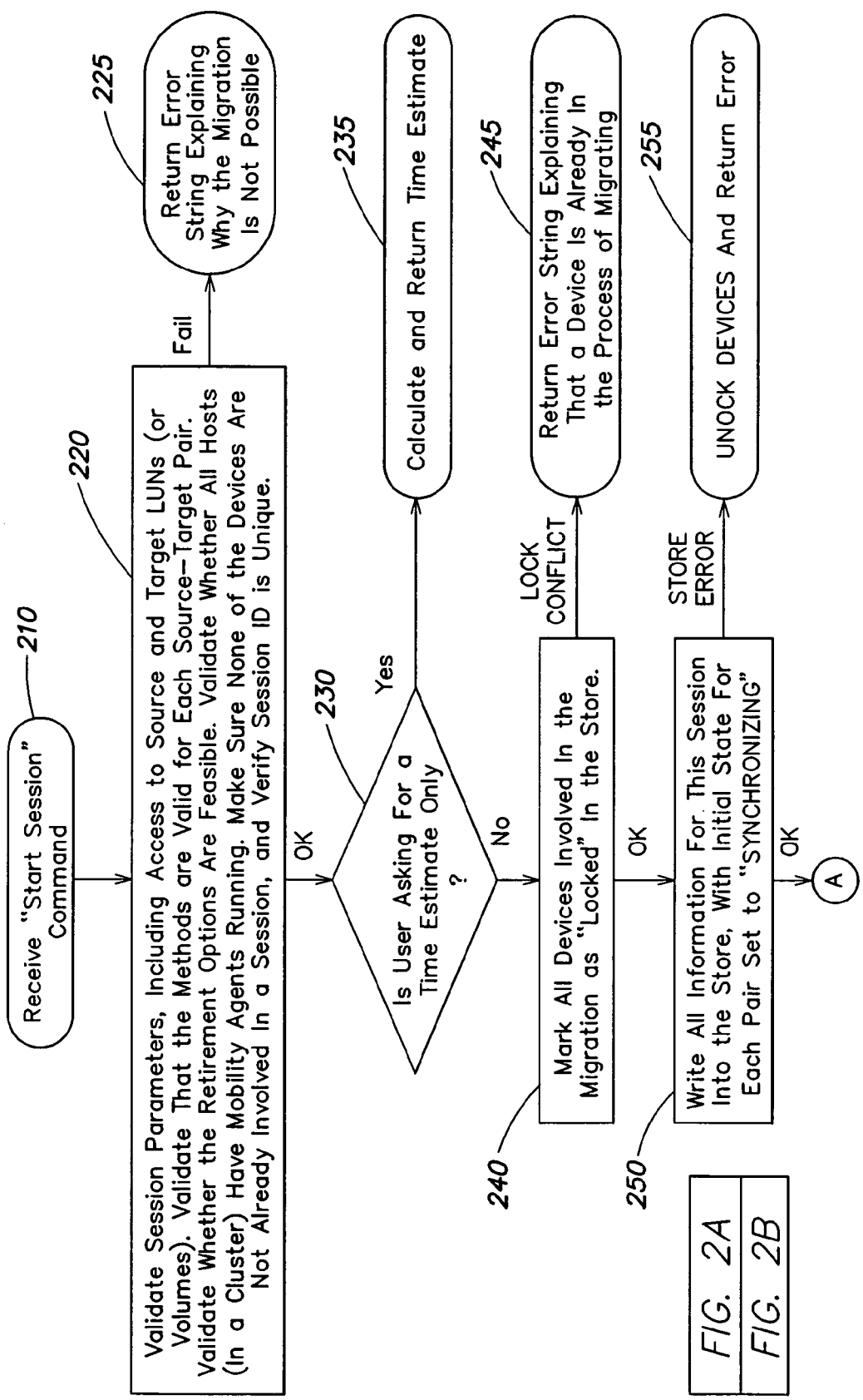
FIG. 2 is a flow diagram of a process used to start a migration session in accordance with one embodiment of the invention.
Figure 2B:
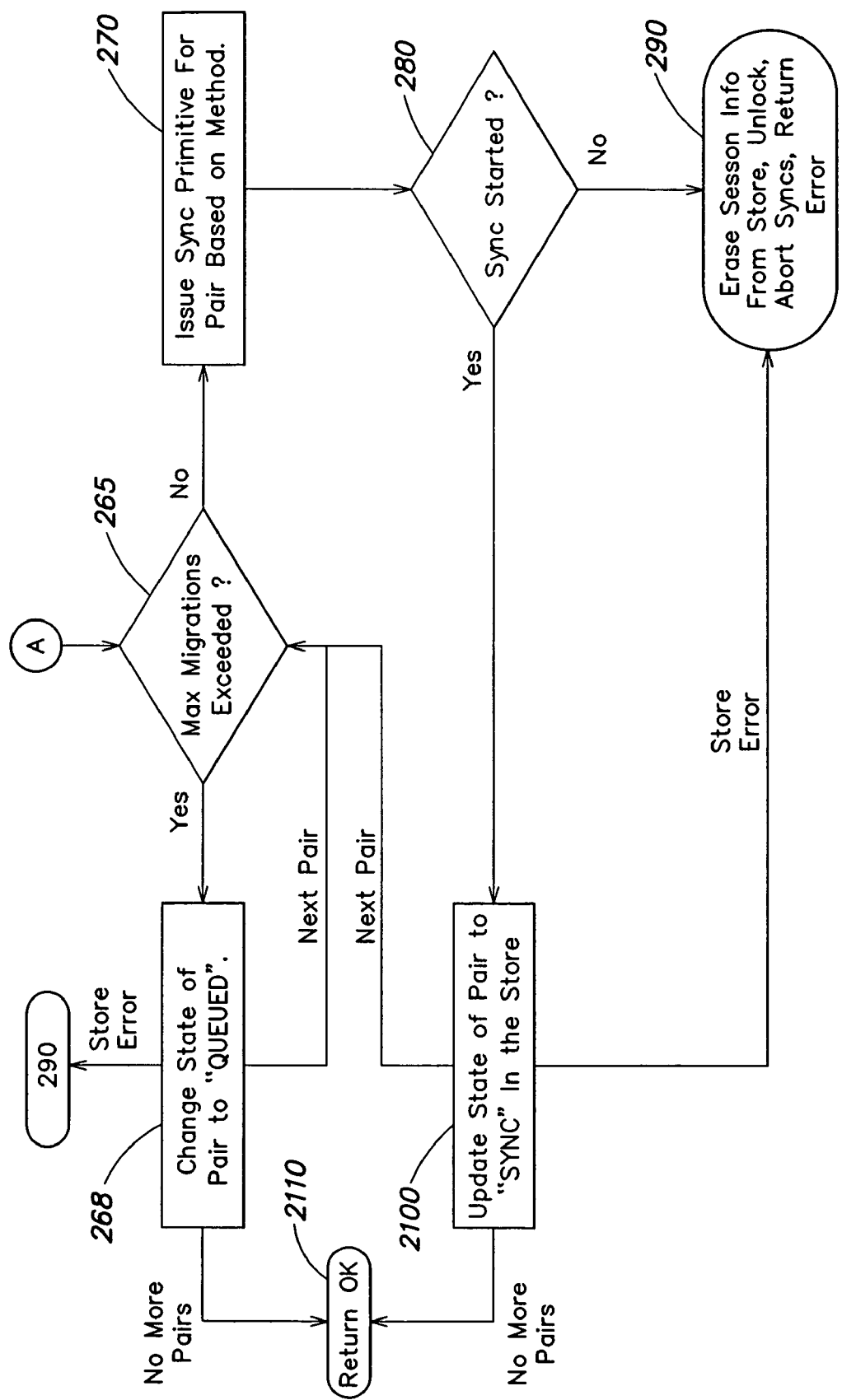

An illustrative process for initiating a migration session is depicted in FIG. 2. As discussed above, in one embodiment a migration session begins when the agent receives instructions for the migration session in the form of a data structure. The data structure is provided to the agent when a "start session" command is received in act 210. The start session command can be received from a user, a management tool (e.g., the ECC management tool) or other entity.

In act 220, the process validates the parameters provided for the migration session. The invention is not limited to validating any specific parameters. The specific parameter validation acts described below provide one example of verification that can be performed with the data structure of FIG. 1.

In act 220, the process validates that it can communicate with and access all named source and target volumes. This can be done in any suitable way, as the invention is not limited to a particular technique. The process also validates the migration method specified for each source/target pair. This may be performed to ensure that the agent can invoke the migration method as specified for each named source/target pair. For example, in one embodiment, a user may select a migration method (e.g., from a standard list provided by a management tool) that may not be available for a particular source/target pair. For example, a storage system-to-storage system hardware mirror facility (e.g., a remote data facility such as EMC's Symmetrix Remote Data Facility, or "SRDF") may be specified as the migration method for a source/target pair, but the storage systems on which the source and target devices reside may not be equipped to execute such a facility (e.g., there may be no direct link between them).

In the embodiment of FIG. 2, the validation act 220 further checks the option specified in the auto-switch/retirement field 130 of FIG. 1. There are numerous ways in which a device can be retired (i.e., made unavailable for access), but various storage systems may support only a subset of such options. For example, in one embodiment, a user may specify that a source device be retired by making it "not ready" after the switch. If the source device resides on a storage system that doesn't support a "not ready" command, the validation will fail.

The validation act 220 further checks that none of the named source or target devices are currently involved in a migration session. This may be important for several reasons. For example, data on a target device could be overwritten and lost if information arrives from two different source devices. In another example, when a migration of data is intended to move data from one location to another, data on a source device should not be migrated to two different target devices. In one embodiment, this check comprises verifying that none of the sources or targets are "locked" by an ongoing migration session. The locking of devices will be discussed in further detail below. This check may be performed in a number of different ways, as the invention is not limited to any particular technique.

The validation act 220 further checks that the session ID 105 (FIG. 1) is unique. This can be done in any of numerous ways. In one embodiment, the process checks the data repository (where a listing of all session IDs is maintained) to ensure that the session identifier has not been used before.

In one embodiment, the validation act 220 also selects the migration method for any source/target pairs for which a migration method is not specifically identified. As discussed above, the data structure may specify the migration method for each source/target pair. In one embodiment, the data structure may alternatively instruct the process to pick a migration method for one or more pairs (e.g., based on the characteristics of the source and target resources). In one embodiment, the process queries each source and target device to determine the relevant characteristics thereof, and determines the most appropriate migration method based upon this information. For example, if a source/target pair includes LUNs on storage systems having a hardware mirroring facility between them, the process may choose that migration method for the pair, but if such a hardware mirroring facility is not available, the process may choose a host-based copy instead. In one embodiment, when the method is chosen for a source/target pair, the data structure is updated to reflect the method for the pair so that the chosen method(s) may be invoked in act 270 (described below).

In the embodiment of FIG. 2, if any of these validation acts fails, the process returns an error message in act 225. The error message may take any of numerous formats. In one embodiment, the error message indicates that the migration can not be performed as requested, and optionally states why (i.e., it identifies failed parameters). In one embodiment, the process returns an error message to the user and/or records the error message in a system log.

It should be appreciated that by validating session parameters before initiating a migration session, the embodiment of FIG. 2 minimizes the chance that a process will begin that cannot be completed as specified, thereby avoiding a waste of resources in beginning such a session. However, it should be appreciated that the invention is not limited in this respect, and that the validation process need not be performed before beginning a migration session.

When the validation act completes successfully, the process proceeds to act 230, wherein a determination is made as to whether the user is only requesting a time estimate for the session (e.g., as specified in the data structure). If so, the process proceeds to act 235 wherein an estimate is calculated and returned to the user, and the process terminates. A time estimate may be useful in helping a user schedule an appropriate time to perform a particular session. The time estimate can be calculated in any of numerous ways, as the invention is not limited to any particular technique. For example, in one embodiment the agent may calculate the estimate by analyzing the volume of data to be migrated, the migration methods specified for each source/target pair, the device types included, their access rates, the number of pairs comprising the session, and/or other information.

When it is determined in act 230 that a time estimate is not requested, the process proceeds to act 240, wherein the agent attempts to lock all source/target pairs which comprise the migration session, thereby preventing other migration sessions from accessing those devices. Devices can be locked in any of numerous ways. In one embodiment, data can be kept in the repository used by the agent to specify devices locked by a migration session. If the attempt in act 240 to lock one or more devices fails because another migration session has already locked it, the process proceeds to act 245 wherein an error message is returned explaining that the device(s) are currently unavailable for the migration session.

Once the source and target devices are successfully locked in act 240, the process proceeds to act 250 wherein the state of each source/target pair is updated. The state may be kept anywhere, and in one embodiment is stored by updating the data structure (FIG. 1) stored in the data repository, which may reside in a persistent storage device to withstand failure. In one embodiment, the state is updated to reflect that a migration request for the devices is "synchronizing". The initial "synchronizing" state indicates that the migration request has been received, but the migration for the pair has not yet been further processed as discussed below. The number of states may vary with more or less process granularity as desired. The present invention is not limited to any particular implementation in this respect. When the process is unable to successfully access or write to the storage space for the status, it proceeds to act 255, wherein the process unlocks the source and target devices, returns an error indicating that the migration was unsuccessful, and the process terminates.

When the write to the repository in act 250 succeeds, the process proceeds to act 265, wherein it determines whether the number of currently pending source/target pair migrations exceeds a predefined maximum number. As discussed above, in one embodiment a migration request may define (e.g., in the priority field 125 of the data structure) a maximum number of active source/target pair transfers as one way to limit the processing resources expended on data migration efforts (which may encompass more than one migration session) at any one time. In one embodiment, this maximum number may be increased or decreased at any time (including while a migration session is in progress) by updating the request, and therefore the data structure which defines the session.

When it is determined in act 265 that the maximum number is not met or exceeded, the process proceeds to act 270, wherein it begins the transfer of data from the source to the target (i.e., the source and target are "synchronized") by invoking the migration method specified for the pair. The process may invoke the migration method in any number of ways. As discussed above, in one embodiment the agent is given access to the program libraries of the facilities which transfer the data, and can thus invoke the appropriate routines as needed. In other embodiments, the agent may utilize an application programming interface (API) to instruct a program executing on a host computer, storage system (e.g., storing the source or target), networking device (e.g., a switch) or other component to perform the data movement. The interface to the migration method is generically referred to in FIG. 2 as a "primitive" that is called to invoke the method. As discussed above, numerous migration methods are possible, including host-based copy (e.g., using an application on the host, a driver in the I/O stack as discussed in the above-referenced application Ser. No. 10/122,556, or the capabilities of an LVM), a storage device-based transfer (e.g., using a mirroring facility such as the Symmetrix Remote Data Facility offered by EMC Corporation), a network device-based transfer (e.g., using a utility for this purpose executing on a switch), or other data transfer utility accessible to the agent.

After the migration method primitive is called in act 270 to invoke the method, the process proceeds to act 280 wherein the process verifies that the migration method has started correctly. If a problem is encountered, the process proceeds to act 290 wherein actions are taken to halt the migration because it cannot complete as specified. For example, the process may update the data repository to reflect that the overall session is aborted. The process may also abort the ongoing synchronizations of other source/target pairs in the session, unlock each source/target pair and return an error. Although the entire session is aborted in the above-discussed embodiment of FIG. 2, the present invention is not limited in this regard. In another embodiment, the agent may abort only the pair in question while allowing other source/target pairs to continue, and may return a notification that the facility specified for the source/target pair in question could not be invoked. The user or process that initiated the migration may then select another migration method for the failed pair and re-attempt the migration.

When it is determined in act 280 that the synchronization has successfully begun, the process proceeds to act 2100 wherein the data repository is updated to reflect the updated state of the source/target pair in question (i.e., that the pair is synchronizing). If the update of the data repository fails for any reason, the process again proceeds to act 290 wherein actions are taken to halt the migration as discussed above.

When the update to the data repository in act 2100 succeeds, a determination is made (in act 2100) as to whether any pairs remain to be processed. When none remain, the process proceeds to act 2110, wherein it completes and returns a message indicating that it completed successfully.

When it is determined in act 2100 that more pairs remain, the process returns to act 265 where it begins to process the next source/target pair. For each source/target pair remaining in the migration session, the process determines (act 265) whether starting the pair exceeds the maximum number of migrations, and if not, the process begins the migration (act 270), validates that it has begun correctly (act 280), and updates (act 2100) the data repository to reflect that the migration has begun.

When a determination is made during processing of a source/target pair at act 265 that the maximum number of migrations is met or exceeded, the process proceeds to act 268, where the state of the pair is changed (e.g., by updating the data repository) to "queued". Pairs in this queued state will be processed at a later time by another process as discussed below with reference to FIG. 7. If the process encounters an error in updating the state of a source/target pair to queued, the process proceeds to act 290 wherein the process aborts as discussed above.

When an update succeeds at act 268, the process proceeds to the next source/target pair and returns to act 265 to determine whether the maximum number of migrations is met or exceeded. In this respect, because one or more migrations may have completed since the last time a determination was made as to whether the maximum number had been met, even if the maximum number of migrations was met or exceeded when a prior pair was processed, it may be possible for the migration of the currently processed pair to begin.

In the manner discussed above, the process loops through acts 265, 270, 280, and 2100 and/or acts 265 and 268 until all pairs have begun synchronizing or placed in a queued state, where the pair(s) await further processing as discussed below.

B. Initiating Migration For Queued Source/Target Pairs

As discussed above, queued pairs have not yet begun synchronizing. Thus, in one embodiment, a technique is employed whereby queued pairs are revisited to begin synchronization of those pairs.

Figure 7A:
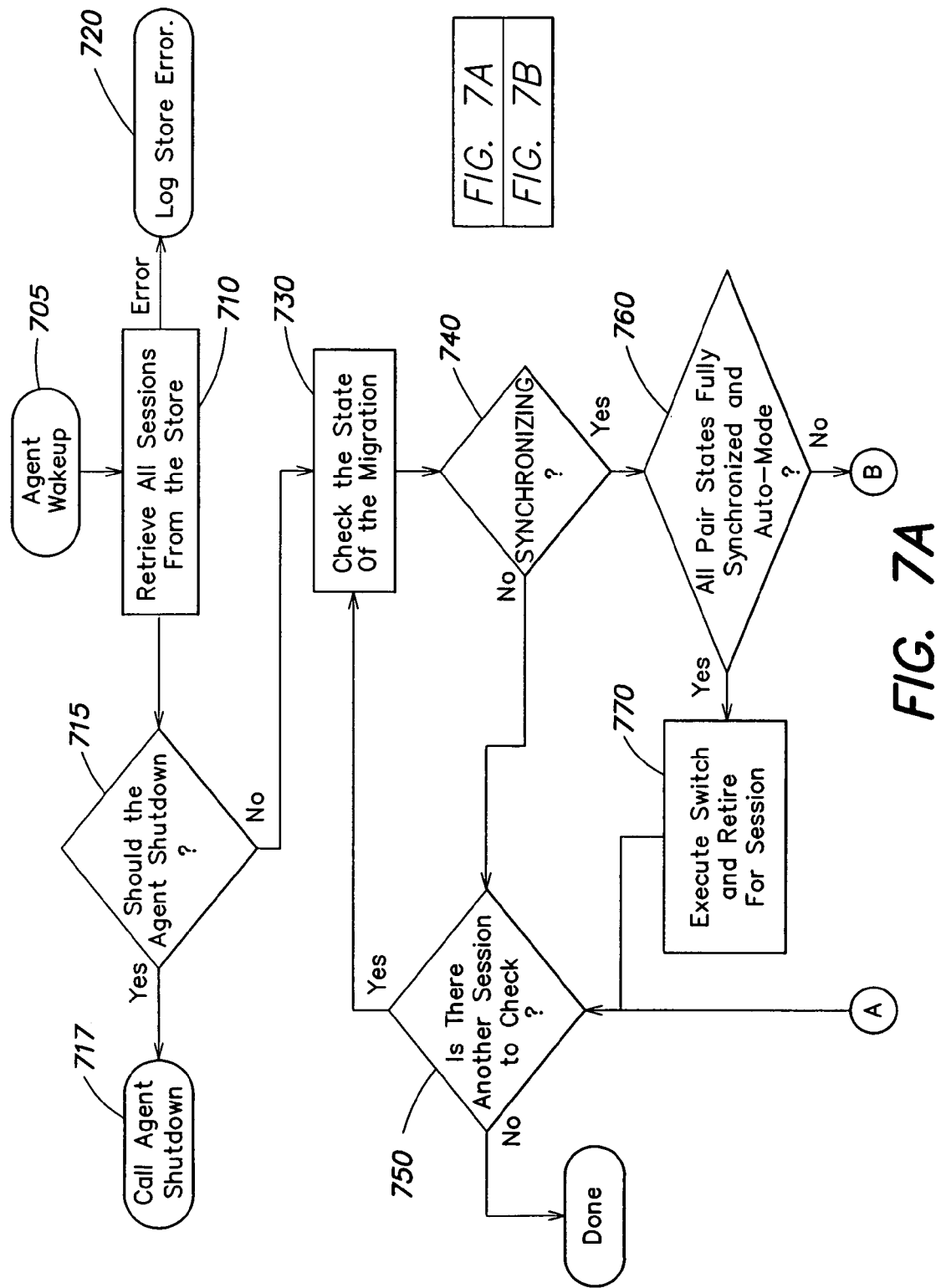
FIG. 7 is a flow diagram depicting a process executed at wakeup by a migration agent used to manage a migration process in accordance with one embodiment of the invention.
Figure 7B:
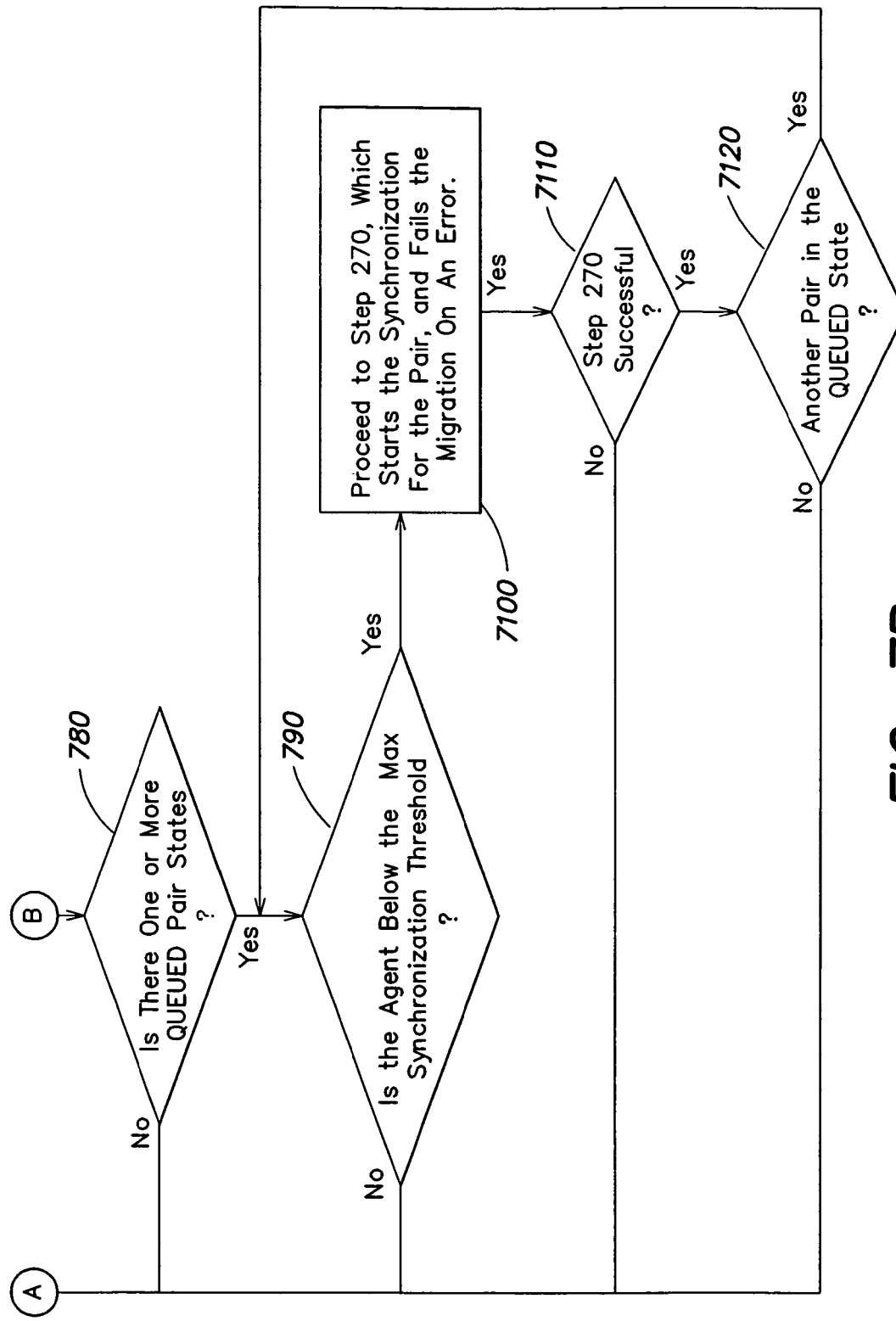

FIG. 7 depicts an illustrative embodiment of a process (which can, for example, be executed by an agent) to process queued source/target pairs. The embodiment depicted is exemplary, as the invention may be implemented in a number of ways. In the embodiment depicted, the process begins at act 705 with agent wakeup. In one embodiment, it is not necessary for the agent to execute at all times, so it may be beneficial for the agent to "sleep" (i.e., be inactive) for periods so as not to occupy system resources during that time. The agent may "wake up" periodically or upon predetermined events to, for example, see if any source/target pairs have completed synchronizing so that the agent can initiate the auto-switch and retire process. In one embodiment, each time the agent awakens it executes the process of FIG. 7, to begin the migration of as many source/target pairs as possible. It should be appreciated that the invention is not limited in this respect, as the agent may never cease executing, or may otherwise not require a wakeup routine.

Agent wakeup may be triggered by any of a number of occurrences. For example, a wakeup routine may start an agent after a predetermined period of inactivity (e.g., every ten minutes), when a certain event occurs (e.g., the completion of one or more source/target pair migrations), when a user sends the agent a request (e.g., a request to shut down, or to modify one or more parameters governing a migration session), or upon any other suitable occurrence.

When the agent wakes up, in act 710 it attempts to ascertain the status of the migration session. In one embodiment, it does this by retrieving information related to the migration session from the data repository, which may have been updated by another process while the agent was asleep. As discussed above, other processes may update the repository. When the agent is unable to access the data repository, the process proceeds to act 720 wherein it returns an error (e.g., by reflecting this failure in a log) and terminates.

When the process successfully accesses the data repository in act 710, it proceeds to act 715, wherein the agent determines whether it should invoke a shutdown procedure. In one example, the agent may shut down because it has reviewed an instruction from the user to do so. In another example, the retrieval of data from the data repository may reveal that there are no sessions in progress, and therefore that there are no actions for the agent to take. When the process determines that it should shut down the agent, it proceeds to act 717 wherein it invokes a routine to shut down the agent, and terminates.

When it is determined in act 715 that the process should not shut down, the process proceeds to act 730 wherein it determines the global state of each ongoing migration session. In one embodiment, for each session selected, the agent aggregates the pair states to determine a global session state. There are numerous ways of performing this aggregation, and the invention is not limited to any particular technique. In one embodiment, if at least one source/target pair is actively synchronizing or is queued, then the global state will be set to "synchronizing" to indicate that the agent may have work to do for the session.

After the global state for the session is determined, the process proceeds to act 740, wherein a determination is made as to whether the global state of the migration session is actively synchronizing.

When it is determined that the session being processed is not actively synchronizing, the process proceeds to act 750, wherein it determines whether other sessions should be checked (i.e., whether other ongoing sessions are under its purview). If there are no others to check, the process terminates (e.g., the agent reverts back to sleep mode). When there are other sessions to check, the agent returns to act 730, wherein it begins processing a next session.

When the process determines in act 740 that the migration session has a global state of synchronizing, it proceeds to act 760, wherein it determines whether each source/target pair has been fully synchronized and the auto-switch option has been selected (e.g., from the information retrieved from the data repository in act 710). When the auto-switch option has been selected and all pairs are fully synchronized, the process proceeds to act 770 wherein it executes the auto-switch and retire process for the session. An illustrative auto-switch and retire process is described below with reference to FIG. 3.

When the process determines in act 760 that all pairs are not fully synchronized, or that the auto-switch option is not selected, the process proceeds to act 780 wherein the process determines (e.g., from the information retrieved from the data repository in act 710) whether any source/target pairs are queued. When none are queued, the process proceeds to act 750, wherein it determines whether another session should be checked in the manner discussed above.

When it is determined in act 780 that at least one source/target pair is queued, the process proceeds to act 790, wherein it determines whether the number of ongoing migrations is below the maximum. When the number of migrations ongoing is not below the maximum, the process proceeds to act 750, wherein it determines whether another session should be checked.

When it is determined at act 790 that the number of ongoing migrations is below the maximum, the process (in act 7100) proceeds to acts 270-2100 in the process of FIG. 2, wherein the agent invokes the specified migration method for a first queued source/target pair. In acts 270-2100, the agent determines whether the synchronization has begun successfully, and if not, it aborts either the source/target pair migration or the migration session overall as discussed above.

After acts 270-2100 have completed, the process proceeds to act 7110, wherein a determination is made as to whether the migration for the processed pair was begun successfully. When it was not, the process proceeds to act 750 to determine whether another session should be checked. When it is determined in act 7110 that the migration was begun successfully, the process proceeds to act 7120 wherein it determines whether another source/target pair exists in a queued state. If so, the process returns to act 790 to process a next pair in the manner discussed above. If no more pairs exist, the process proceeds to act 750, wherein it determines whether another session should be checked.

C. Pausing a Migration Session

Figure 5:
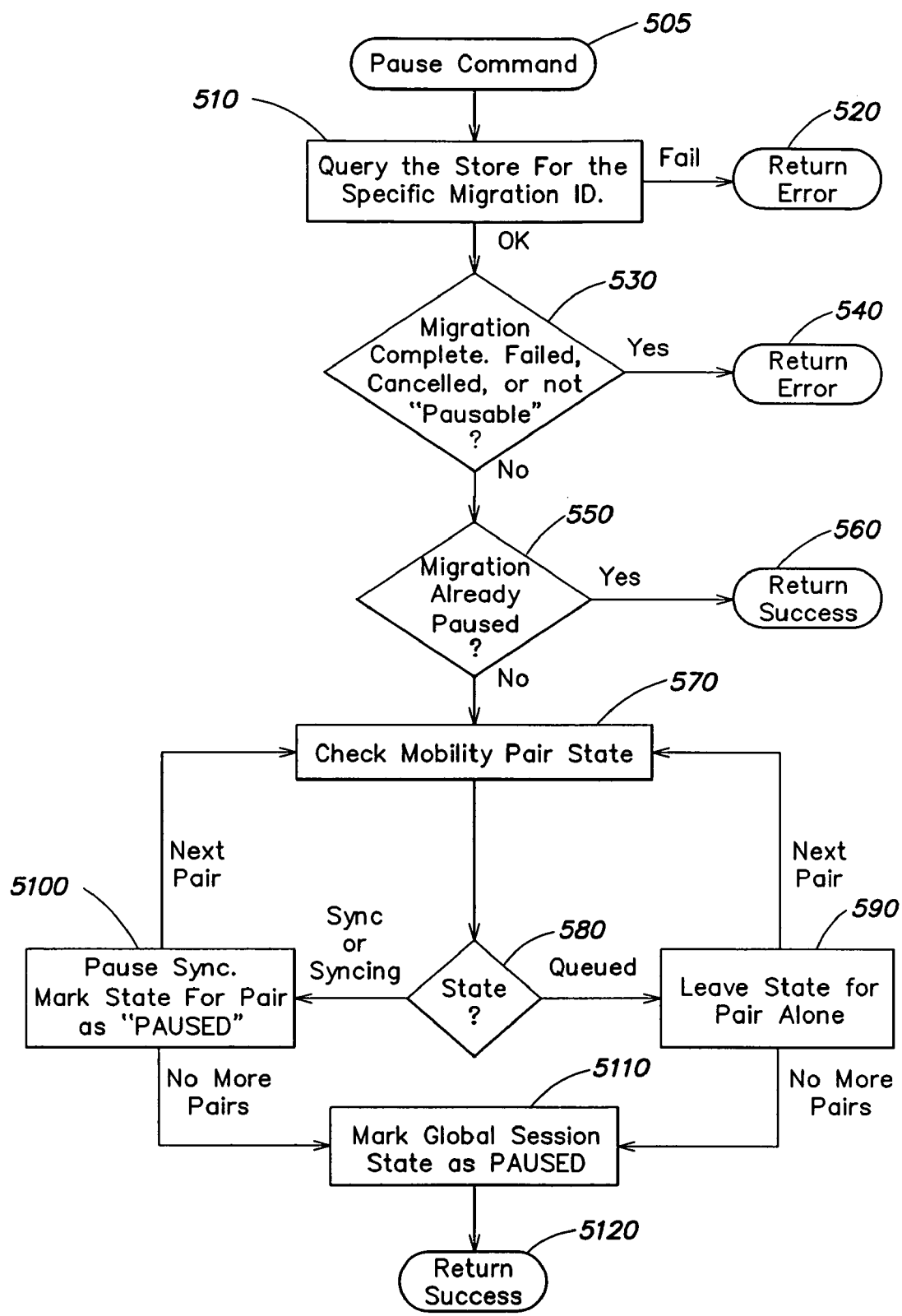
FIG. 5 is a flow diagram depicting a process used to pause a migration session in accordance with one embodiment of the invention.

As discussed above, in one embodiment the capability to pause a migration session is provided. The invention is not limited in this regard, as other implementations need not provide such a capability. FIG. 5 depicts one embodiment of a process performed by the agent to pause a migration session. The depicted process is merely exemplary, as other implementations are possible.

In act 505, the agent receives a pause command. The pause command might be issued by a number of different entities and for a number of different reasons. For instance, a user might issue a pause command if the migration session is occupying an inordinate amount of processing resources, causing other system operations to proceed too slowly. Without the benefit of a pause command, a user would be forced to abort the migration entirely (thereby sacrificing progress already made), or allow it to continue despite the undesired impact on system performance. The pause capability provides greater flexibility and control over the migration and its impact on system performance.

When the pause command is received by the agent, in act 510 the process retrieves information related to the migration session (e.g., from the data repository). When that retrieval is unsuccessful, the process proceeds to act 520 wherein it returns an error (e.g., by returning an error message to the user and/or recording an error message in a system log).

When information related to the session is successfully retrieved, the process proceeds to act 530, wherein the agent ascertains whether the migration is in progress and can be paused. Conditions which may prevent a session from being paused include its having already completed, failed or having been canceled. In addition, a session may not be pause-able if it utilizes (at least in part) a migration method which cannot be paused (e.g., some hardware mirroring facilities may not permit pausing). However, the invention is not limited in this respect. In one embodiment, if the process determines that one or more pairs cannot be paused but others can, it will pause those pairs that it can. When the process determines in act 530 that the session cannot be paused, the process proceeds to act 540, wherein it returns an error.

When the process determines in act 530 that the migration session can be paused, it proceeds to act 550, wherein it ascertains whether the migration has already been paused. If it has already been paused, the process returns a message in act 560 indicating successful pausing of the session.

When it is determined in act 550 that the migration has not already been paused, the process proceeds to acts 570 and 580, wherein it checks the state for a first source/target pair in the migration session. The source/target pairs may be chosen in any order using any method. When it is determined that the chosen source/target pair is actively synchronizing (i.e., its state is "sync") or that a request has been received to synchronize the pair but actual data transfer has not yet begun (i.e., its state is "synchronizing"), the process goes to act 5100 wherein it pauses the migration method used for that pair and updates the data repository to reflect that the pair is paused. The pair may be paused in any of numerous ways, which may depend on the migration method used for the pair. It should be appreciated that a pause-able method should provide the capability to determine at what point in the migration the pause command was received, so that the migration can be restarted from that point. After the pair is paused, the process determines (in act 5100) whether any pairs remain. If so, the process goes to the next pair and returns to act 570.

When it is determined in act 580 that the source/target pair is queued, the process proceeds to act 590 wherein the agent leaves the state of the pair unchanged, since there is no migration activity to pause. The process then determines (in act 590) whether any pairs remain and, if so, goes to the next pair and returns to act 570.

When it is determined in either act 5100 or 590 that all applicable pairs have been processed, the process proceeds to act 5110, wherein it updates the data repository to reflect the global state for the migration session as paused. The process then proceeds to act 5120, wherein it returns a message (e.g., to the user and/or in a system log) that the pause has completed successfully.

In one embodiment, a migration session may be paused more than once. This may be useful in that it may provide for scheduling migration activities during periods of light system activity. For example, a migration executing at night can be paused when the business day begins, restarted (as discussed below) at lunchtime, paused again in the afternoon, then restarted in the evening. This scenario is merely exemplary, as the number of times that a migration session may be paused is unlimited.

D. Restarting a Migration Session

Figure 6:
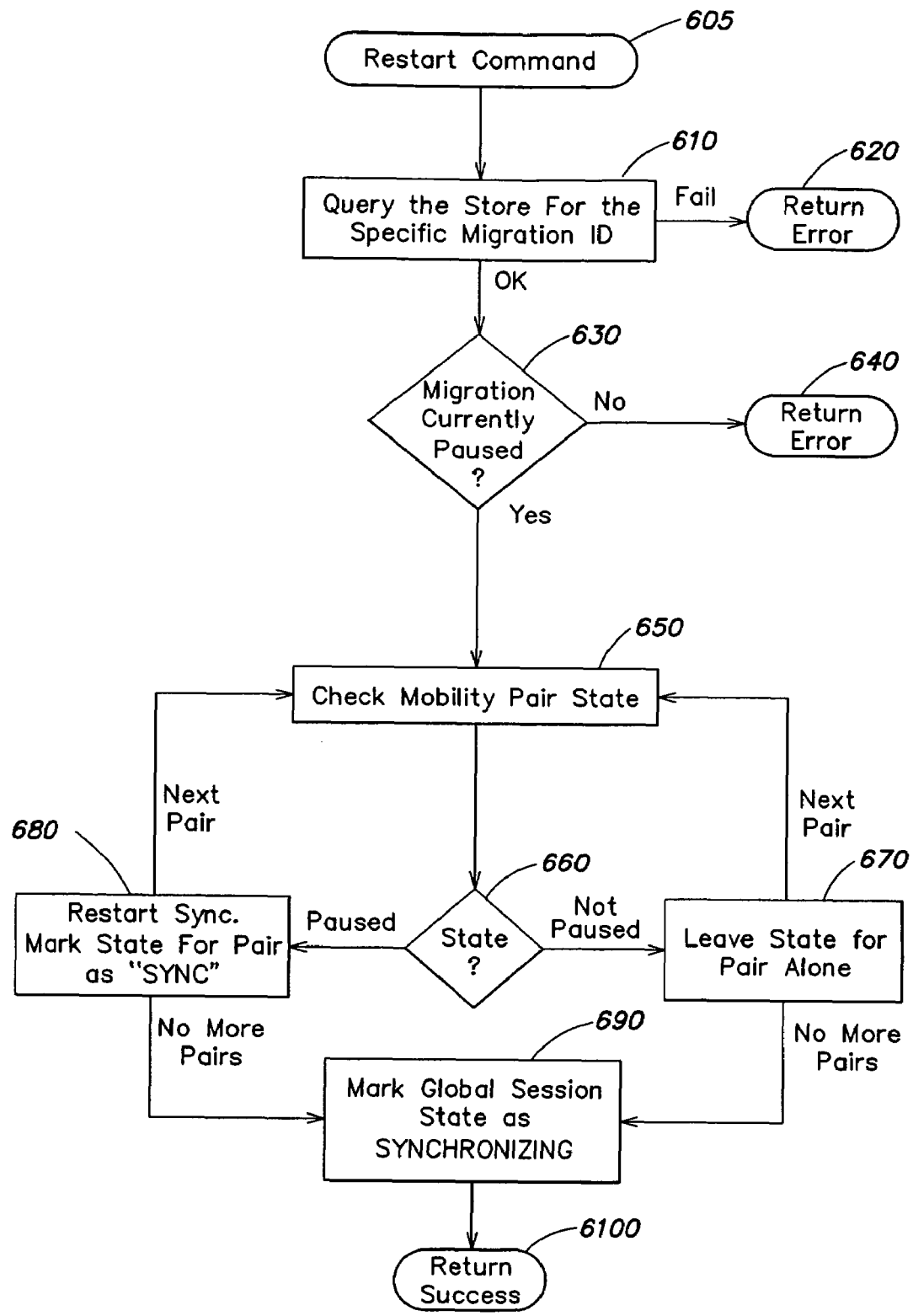
FIG. 6 is a flow diagram depicting a process used to restart a paused migration session in accordance with one embodiment of the invention.

FIG. 6 depicts one embodiment of a process through which the agent resumes a previously paused process. The depicted embodiment is merely exemplary, as restarting a process can be performed in numerous ways. In act 605, the agent receives a restart command. The restart command may be issued by a user, management tool or other entity.

In response to receipt of the restart command, in act 610 the process retrieves information related to the migration session from the data repository. If that retrieval is unsuccessful, the process proceeds to act 620 wherein it returns an error (e.g., to a user and/or in a system log).

When the retrieval is successful, the process proceeds to act 630, wherein it determines whether the migration session is currently paused. If the session is not paused, the process returns an error to this effect in act 640.

When it is determined in act 630 that the migration session is currently paused, the process proceeds with a series of acts analogous to several described with reference to FIG. 5. In acts 650 and 660, the process checks the state for a first source/target pair in the migration session. As with the process of FIG. 5, the source/target pairs may be processed in any order. When it is determined in act 660 that the considered source/target pair is currently paused, the process proceeds to act 680, wherein it restarts the migration method used for that pair, and updates the data repository to reflect that the pair is actively synchronizing. The process then determines (in act 680) whether more pairs remain to be processed, and if so, goes to the next pair and returns to act 650.

When it is determined in act 660 that the source/target pair is not paused (e.g., if the considered pair is utilizing a migration method which can not be paused), the process proceeds to act 670, wherein the process leaves the state of the pair unchanged, since there is no paused activity to restart. When there are more pairs to examine, the process returns to act 650 to check the next pair's state.

When it is determined in act 670 or 680 that all source/target pairs have been processed, the process proceeds to act 690, wherein the process updates the data repository to reflect the global state of the migration session as actively synchronizing. The process then proceeds to act 6100, wherein it returns a message (e.g., to a user and/or a system log) indicating that the session has been restarted successfully.

E. Canceling A Migration Session

Figure 4:
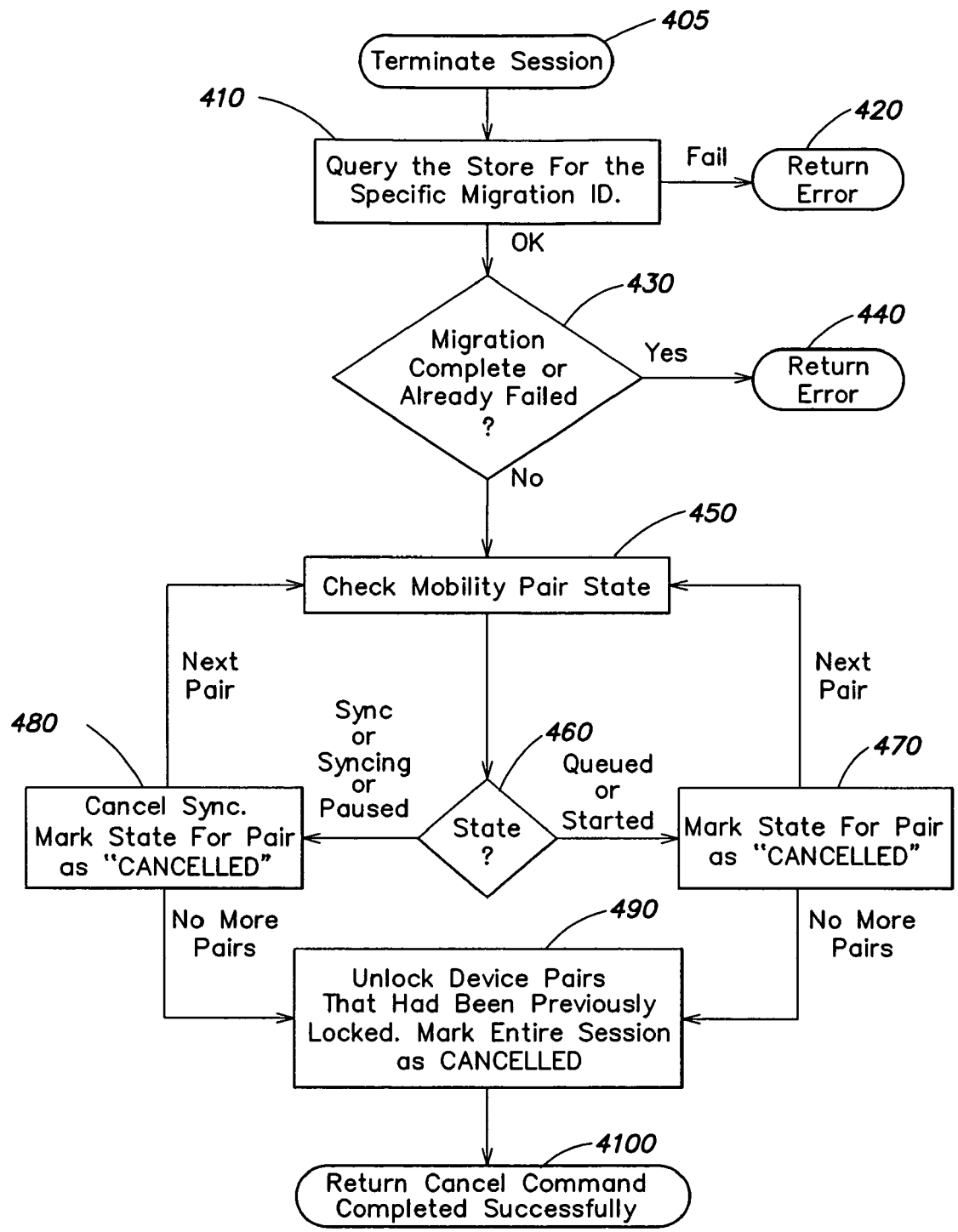
FIG. 4 is a flow diagram depicting a process used to cancel a migration session in accordance with one embodiment of the invention.

In one embodiment, a migration session may be cancelled. The invention is not limited in this regard, as other implementations need not provide this capability. FIG. 4 depicts an illustrative embodiment of a process through which a migration session may be cancelled. The embodiment of FIG. 4 is merely exemplary, as other implementations may be employed to cancel a migration session.

In act 405, the agent receives a command to terminate or cancel the session. The cancel command may be issued by a user, management tool or other entity. In response to the cancel command, in act 410 the process retrieves information related to the migration session from the data repository. When that retrieval is unsuccessful, the process proceeds to act 420, wherein it returns an error.

After successful retrieval, the process proceeds to act 430, wherein it determines whether the migration session in question has already completed or failed, and thus cannot be cancelled. If it has completed or failed, the process proceeds to act 440 to report an error.

When it is determined in act 430 that the migration session has not already completed or failed, the process proceeds to acts 450 and 460, wherein it ascertains the state for a first source/target pair in the migration session. As with the process depicted in FIG. 6, the source/target pairs may be chosen in any order and using any method. When it is determined that the source/target pair is paused, actively synchronizing, or that a request has been received to synchronize but data transfer has not yet begun, the process proceeds to act 480, wherein the agent cancels the migration method for that pair (e.g., by calling the migration method and instructing it to cancel), and updates the data repository to reflect the state for the pair as canceled. The process then (in act 480) determines whether other pairs remain, and if so, goes to the next pair and returns to act 450.

When it is determined in act 460 that the state of the source/target pair is queued or started (i.e., the request to perform the migration between the pair has been received, but the pair is not yet actively synchronizing), the process proceeds to act 470, wherein the process updates the data repository to reflect the state of the pair as canceled. No action is taken in act 470 to cancel any migration process for the pair, because the migration method is not active. After the data repository is updated, the process (in act 470) determines whether there are other pairs to examine, and if so, returns to act 450.

When it is determined at act 470 or 480 that all source/target pairs have been processed, the process proceeds to act 490, wherein it unlocks each source/target pair to make them available for another migration. As discussed above, in one embodiment, this can be done by updating the data repository to reflect that each device is no longer locked. Once all devices are unlocked, the process updates the data repository to reflect the global state of migration session as being canceled and proceeds to act 4100, wherein the process reports that cancellation was successful (e.g., by presenting a message to this effect to the user and/or recording a message to this effect in a system log).

F. Auto-Switch and Retire Function

As discussed above, in one embodiment the agent can manage a migration process with an auto-switch and retirement capability, wherein data access attempts are automatically switched to the target location, without reconfiguring host computers, at the completion of the migration.

Figure 3:
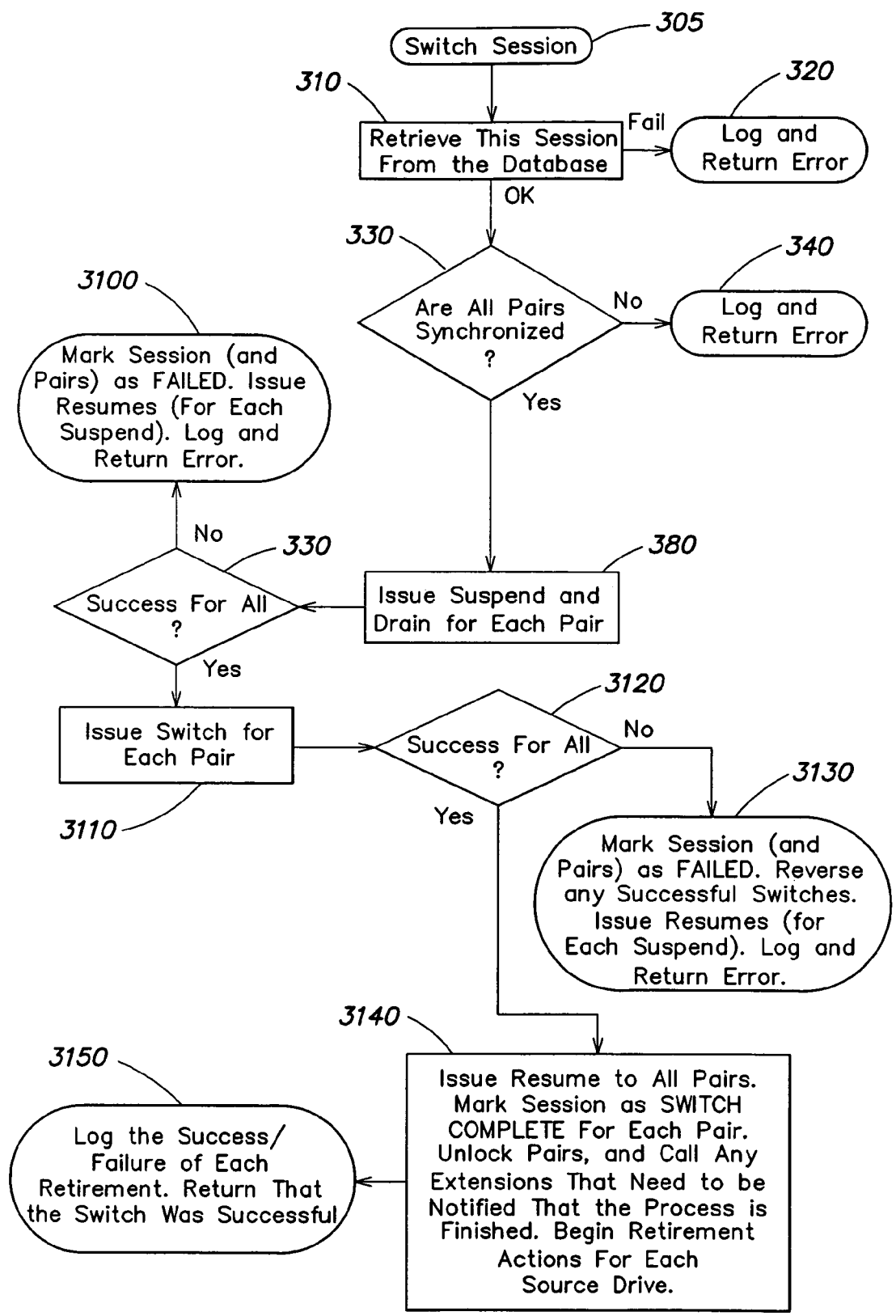
FIG. 3 is a flow diagram of a process used to automatically switch from each source to each target at the completion of a migration session in accordance with one embodiment of the invention.

FIG. 3 depicts an illustrative process to manage the auto-switch function and retirement of the source storage resource. The depicted embodiment is merely exemplary, as the auto-switch and retirement process may be performed in numerous ways. In the embodiment shown in FIG. 3, the agent performs an auto-switch and retire only when the entire migration session has completed. However, the invention is not limited this respect, as the agent can alternatively perform this process on a subset of the source/target pairs (e.g., one at a time) at the completion of their respective migrations.

The process may be initiated in response to the agent detecting that synchronization for all pairs is completed for a migration session when the data structure specifies that an auto-switch be performed. Alternatively, this process may be initiated in response to an auto-switch command received from a user. Such a command may be submitted when the user sees that all source/target pairs comprising a migration session have been synchronized. Other techniques for initiating an auto-switch process may be used, as the invention is not limited to any particular technique.

When the auto-switch process is initiated, in act 310 the process retrieves information related to the migration session from the data repository. When that retrieval is unsuccessful, the process proceeds to act 320, wherein it returns an error (e.g., by presenting a message to a user and/or recording an error message in a system log).

When the retrieval is successful, the process proceeds to act 330, wherein it determines whether all the source/target pairs comprising the migration session have completed synchronizing, and if not, the process proceeds to act 340 to return an error. As discussed above, in other embodiments the process may execute the auto-switch for a subset of source/target pairs, so acts 330-340 need not be performed for those embodiments.

When it is determined in act 330 that all pairs have been synchronized, the process proceeds to act 380, wherein for each source/target pair for which the auto-switch is to be performed, the process initiates a "suspend and drain" process. Such a process is described in the above-referenced application Ser. No. 10/122,556. In this process, all future input/output requests directed at the source volume(s) are temporarily suspended (in one embodiment, these requests are queued in sequence for subsequent processing against the target volume(s)), and all pending requests are executed (i.e., drained) until no I/O requests remain pending. With some migration methods (e.g., a logical volume manager), a suspend and drain process may not be required, as the migration method itself may provide for temporarily discontinuing I/O requests.

After issuing the suspend and drain, the process proceeds to act 390, wherein it determines whether the suspend and drain process was successful for each source volume. If it was not successful, the process proceeds to act 3100 to take appropriate action. In the embodiment shown, the process updates the data repository to reflect the global state of the migration session as having failed. In an alternative embodiment, the process can update the data repository to reflect that only the source/target pair subset(s) for which the suspend and drain was unsuccessful. In act 3100, the process also takes action to allow access to the source volume(s) to resume, so that the applications are not indefinitely held up by suspended I/O requests. Finally, the process may return an error (e.g., by presenting a message to the user and/or recording an error message in a system log).

When it is determined at act 390 that the suspend and drain was successful for each source/target pair, the process proceeds to act 3110, wherein it initiates a switch for each source/target pair, so that I/O requests directed at the source volume(s) are redirected to the target volume(s). The switch may be accomplished in any number of ways, as the invention is not limited to any particular technique. In one embodiment for use with the redirection technique described in above-referenced application Ser. No. 10/122,556, the process may accomplish the switch by issuing a command to the base driver on the host computer(s).

The process then proceeds to act 3120 to determine whether the switch was successful for all source/target pairs in question, and if not, proceeds to act 3130. In act 3130, the agent updates the repository to reflect the global state of the migration process as having failed, and returns an error to that effect. In addition, the process reverses any successful switches, and resumes I/O to all of the source volume(s).

When it is determined in act 3120 that the switch was performed successfully for the source/target pairs in question, the process proceeds to act 3140, wherein it instructs the host computer(s) to resume I/O (which will now be directed at the target volume(s)). The process also updates the status information in the data repository to reflect that the switch is complete for each source/target pair, unlocks the source/target pairs so that other migration sessions may access the devices if desired, and notifies any other processes executing on the computer system that should be notified that the migration has completed. Examples of the types of processes that may be notified in act 3140 include the migration method, which may then perform some clean up operation associated with the migration.

When it has been instructed to do so (either via the data structure or a direct command), in act 3140 the process also initiates source retirement. Source retirement may be performed in any number of ways, as the invention is not limited to any particular technique.

G. Start Up

Figure 8:
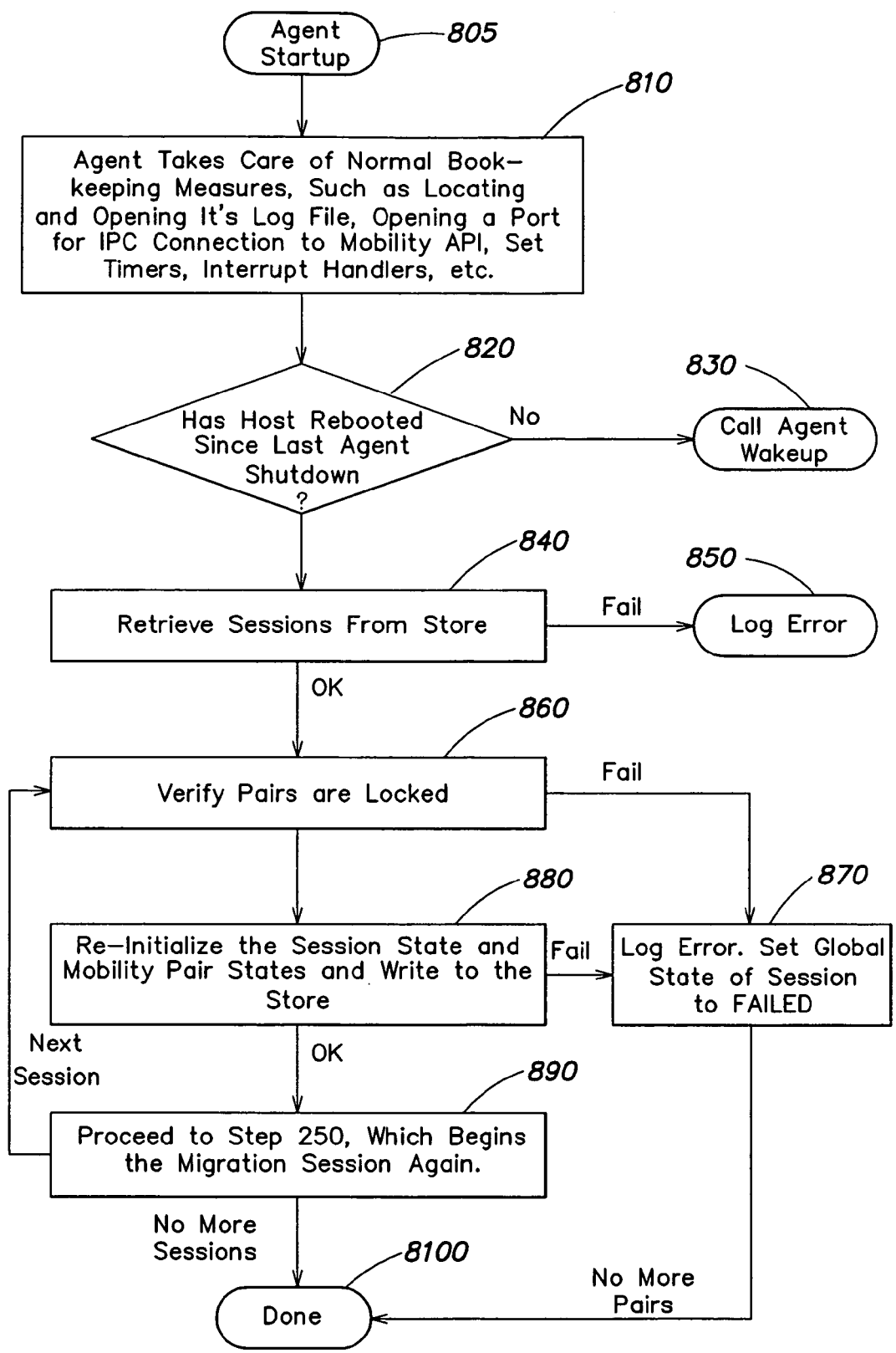
FIG. 8 is a flow diagram depicting a process executed at startup by a migration agent in accordance with one embodiment of the invention.
Figure 9:
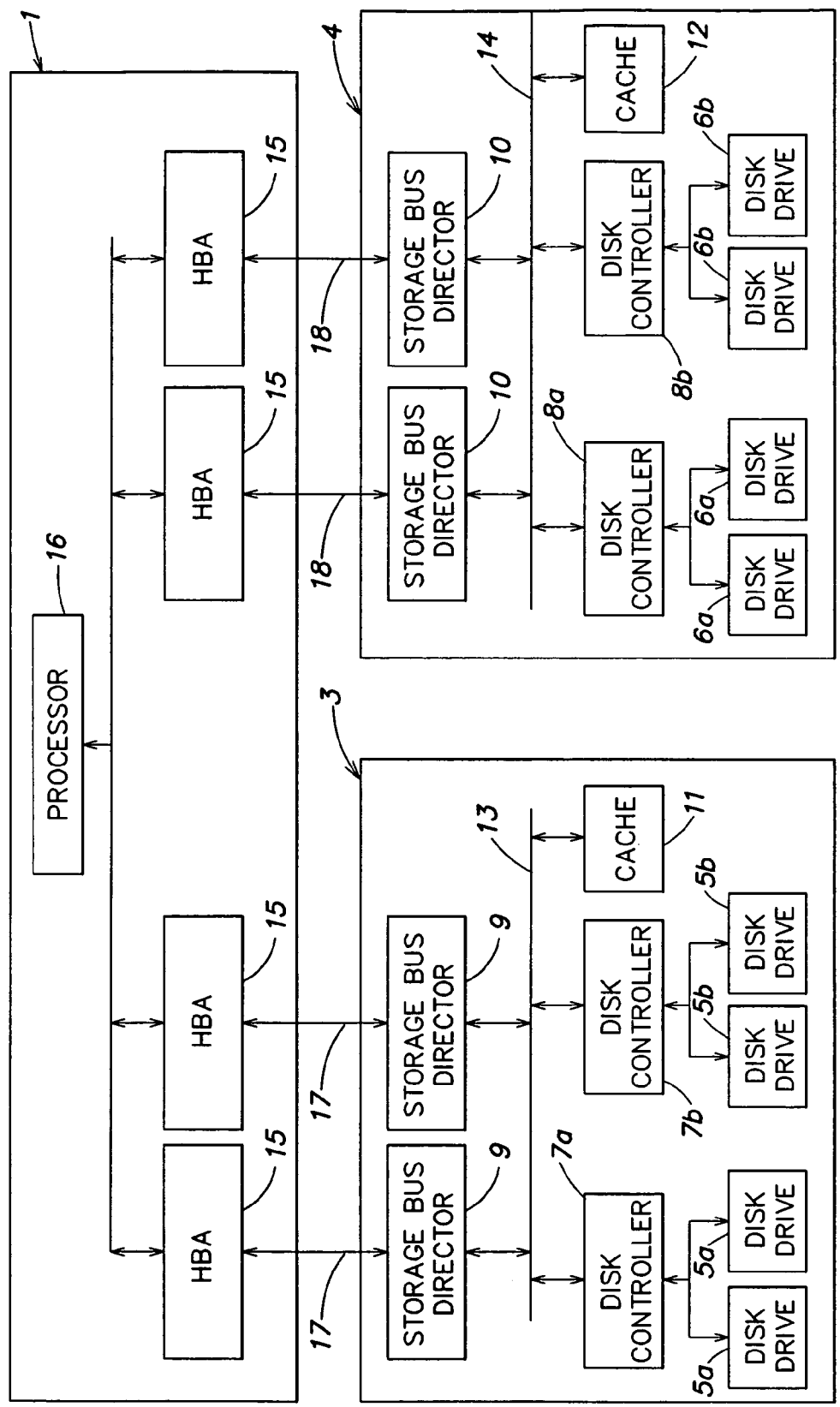
FIG. 9 is a block diagram of an exemplary computer system on which aspects of the present invention can be implemented.

The startup process is to be distinguished from the wakeup routine described with reference to FIG. 7, and is executed when the agent is started, either initially or following a system failure. FIG. 8 depicts one embodiment of a process performed by the agent upon startup. This process is merely exemplary, as numerous other implementations for a startup process are possible.

In act 805, the agent receives a command to start up and proceeds to act 810. In act 810, the process performs a number of bookkeeping measures. For example, the process may locate and open any log files to be used, open a port for inter-process communication (IPC) with one or more APIs, set timers and interrupt handlers, and perform other similar acts.

The process then proceeds to act 820, wherein it determines whether the host computer which executes the migration session being managed has re-booted since the last agent shutdown. This determination is made because a reboot of the host may have resulted from a failure of the host during an active migration, so that the process may perform certain acts discussed below in response. The determination of whether the host rebooted since the last agent shutdown is merely one example of a technique for determining a potential host failure during a migration, as other techniques are possible.

When it is determined in act 820 that the host has not rebooted since the last agent shutdown, the process proceeds to act 830 wherein it calls the wakeup routine of FIG. 7 to determine the state of migrations currently outstanding, and to determine whether there is action for the agent to take, as discussed above.

When it is determined in act 820 that the host has rebooted since the last agent shutdown, the process proceeds to act 840, wherein it attempts to retrieve information on all ongoing migration sessions from the data repository. If the agent is unsuccessful in doing so, the process proceeds to act 850, wherein it reports an error to that effect (e.g., to the user and/or in a system log).

When the retrieval of information on the session is successful, the process proceeds to act 860, wherein it determines whether each source/target pair within the migration session is still locked. When the agent determines that any of the source/target pairs are no longer locked, the process proceeds to act 870, wherein the agent reports an error (e.g., by a message to the user and/or in a system log), updates the data repository to reflect the global state of the migration session as having failed, and concludes the process.

As discussed above, in one embodiment the process is capable of managing each source/target pair migration independently. Thus, in an alternate embodiment, the process may determine that only the pairs which are unlocked have failed, and those which remain locked may be re-initiated.

When it is determined in act 860 that all source/target pairs remain locked, the process proceeds to act 880 wherein the process prepares the synchronization to begin anew by updating the data repository to reflect the state of the pairs as synchronizing (i.e., to reflect that a migration session request has been received for the pair, but that data transfer has not yet begun). If the update to the repository fails, the process proceeds to act 870 to report an error.

When the data repository has been updated, the process proceeds to act 890, wherein it begins the migration session again by proceeding to act 250, described above with reference to FIG. 2. After the completion of act 890 for the first migration session, in one embodiment the process proceeds to the next session, if one exists. The process then loops through acts 860, 880 and 890 for each remaining session until it is determined in act 890 that all sessions have been processed. At this point, the process proceeds to act 8100, wherein the process terminates.

In one embodiment, if the migration session is one which saves state during operation, a migration session may be restarted from the point at which it failed. Although advantageous, the present invention is not limited in this respect, as the migration session can, alternatively, be restarted from the beginning.

In one embodiment, if the migration method is one which would not have been interrupted by a failure of the host (e.g., a hardware mirroring facility implemented by the storage systems), it may not be necessary to take any action to re-initiate the migration method.

III. Agent and Data Repository Configuration

In one embodiment, the operation of a group of agents is coordinated by a central management facility, such as the above-described ECC management tool. However, the invention is not limited in this regard; among the possible operable agent configurations are those where the operations of one or more agents are coordinated by a single "master" agent. Alternatively, multiple agents may operate in parallel, function so that a management tool coordinates the operations of only a subset of all agents deployed, and other configurations. With source data which is accessed by more than one host computer (such as when host computers comprise a cluster, wherein multiple hosts act as a single system to enable high availability, load balancing and/or parallel processing), it may be advantageous to deploy multiple agents to work in concert.

In one embodiment, the agent operates in response to instructions provided by a user (which may be an administrator, although the invention is not limited in this respect). The user may provide these instructions via a graphical user interface (GUI) (e.g., provided by a management tool), which may allow the user to specify parameters for each source/target pair and/or the migration session overall. However, the invention is not limited in this respect, as other input facilities (such as a command line interface, or other suitably designed input facility) may be employed.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. In this respect, it should be appreciated that the above-discussed functions of the agent can be distributed among multiple processes and/or systems. It should further be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A computer-readable medium having instructions recorded thereon that, when executed, perform a method of controlling a migration of a data set stored on at least one source storage resource in a source storage system to at least one target storage resource in a target storage system in a computer system, the method comprising acts of:

(A) initiating a migration of the data set so that a first portion of the data set is transferred from the at least one source storage resource and the source storage system to at least one intermediary entity, and from the at least one intermediary entity to the at least one target storage resource;

(B) pausing at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource; and (C) resuming the migration so that the second portion of the data set is transferred from the at least one source storage resource and the source storage system to the at least one intermediary entity, and from the at least one intermediary entity to the at least one target storage resource, without re-transferring at least a subset of the first portion of the data set;

wherein the at least one intermediary entity comprises at least one component separate from the source and target storage systems.

2. The computer-readable medium of claim 1, wherein the computer system comprises at least one migration vehicle capable of transferring data from the at least one source storage resource to the at least one target storage resource, wherein the act (A) comprises an act of instructing the at least one migration vehicle to initiate the migration, the act (B) comprises an act of instructing the at least one migration vehicle to pause the migration, and the act (C) comprises an act of instructing the at least one migration vehicle to resume the migration.

3. The computer-readable medium of claim 1, wherein the method further comprises an act of, in response to an instruction to pause the migration, determining whether the migration can be paused.

4. The computer-readable medium of claim 1, wherein the act (B) is performed in response to an instruction to pause the migration.

5. The computer-readable medium of claim 1, wherein the at least one source storage resource comprises a plurality of source storage resources including a first source storage resource and the at least one target storage resource comprises a plurality of target storage resources including a first target storage resource, wherein the act (A) comprises an act of initiating a migration of data on the first source storage resource to the first target storage resource, and the act (B) comprises an act of allowing the migration of the data on the first source storage resource to the first target storage resource to continue so that at least a portion of the migration is not paused.

6. An apparatus for migrating a data set, stored on at least one source storage resource in a source storage system, to at least one target storage resource in a target storage system in a computer system, the apparatus comprising:
at least one processor that is programmed to;
begin a migration of the data set by transferring a first portion of the data set from the at least one source storage resource and the source storage system to at least one intermediary entity, and from the at least one intermediary entity to the at least one target storage resource;
pause at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource; and
resume the migration by transferring the second portion of the data set from the at least one source storage resource and the source storage system to the at least one intermediary entity, and from the at least one intermediary entity to the at least one target storage resource, without re-transferring at least a subset of the first portion of the data set;
wherein the at least one intermediary entity comprises at least one component separate from the source and target storage systems.

7. The apparatus of claim 6, wherein the at least one processor is further programmed to, in response to an instruction to pause the migration, determine whether the migration can be paused.

8. The apparatus of claim 6, wherein the at least one processor is further programmed to store state information identifying portions of the data set transferred from the at least one source storage resource to the at least one target storage resource, and when the migration is resumed, to review the stored state information to identify portions of the data set that are already transferred from the at least one source storage resource to the at least one target storage resource.

9. The apparatus of claim 6, wherein the at least one processor is programmed to copy the first portion of the data set from the at least one source storage resource to the at least one intermediary entity, and from the at least one intermediary entity to the at least one target storage resource, and to copy the second portion of the data set from the at least one source storage resource to the at least one intermediary entity, and from the at least one intermediary entity to the at least one target storage resource.

10. The apparatus of claim 6, wherein the data set comprises a set of logically related data.

11. An apparatus for migrating a data set, stored on at least one source storage resource, to at least one target storage resource in a computer system, the apparatus comprising:
at least one processor that is programmed to;
initiate a migration of the data, set so that a first portion of the data set is transferred from the at least one source storage resource to the at least one target storage resource;
execute an instruction to pause at least a portion of the migration to stop a transfer of at least a portion of the data set from the at least one source storage resource to the at least one target storage resource at a point in the migration where a second portion of the data set has not yet been transferred from the at least one source storage resource to the at least one target storage resource; and
resume the migration so that the second portion of the data set is transferred from the at least one source storage resource to the at least one target storage resource without re-transferring at least a subset of the first portion of the data set.

12. The apparatus of claim 11, wherein the at least one processor is further programmed to, in response to an instruction to pause the migration, determine whether the migration can be paused.

13. The apparatus of claim 11, wherein the computer system includes at least one migration vehicle that is capable of transferring data from the at least one source storage resource to the at least one target storage resource, and wherein the at least one processor is further programmed to communicate with the at least one migration vehicle to initiate, pause and resume the migration.

14. The apparatus of claim 11, wherein the data set comprises a set of logically related data.

15. The apparatus of claim 11, wherein the at least one source storage resource comprises a plurality of source storage resources, wherein the at least one target storage resource comprises a plurality of target storage resources, wherein the at least one processor is programmed to initiate transfers of data between a plurality of pairs of source and target storage resources, and wherein the at least one processor is further programmed to pause transfers between a subset of the plurality of pairs of source and target storage resources while transfers between other pairs of source and target storage resources continue.

16. A method of initiating a move of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources, the method comprising acts of:
(A) beginning an active transfer of data, for each of a first set of the plurality of groups, from the source storage resource to the at least one target storage resource; and
(B) queuing, for later processing, a second set of the plurality of groups, so that an active transfer of data for the second set of the plurality of groups is not begun at a same time as for the first set of the plurality of groups.

17. The method of claim 16, further comprising an act (C) of initially processing each of the plurality of groups, including;

determining, at a time a selected group is processed, whether a number of groups for which data is actively being transferred exceeds a maximum number;

when the number of groups for which data is actively being transferred does not exceed the maximum number, including the selected group in the first set for which active transfer is begun in the act (A); and when the number of groups for which data is actively being transferred exceeds the maximum number, including the selected group in the second set that is queued in the act (B).

18. The method of claim 17, further comprising an act (D), executed subsequent to acts (A)-(C), of re-processing the second set of the plurality of groups queued in the act (B), the act (D) comprising acts of:

determining, at a time a selected group is re-processed, whether a number of groups for which data is actively being transferred exceeds a maximum number;

when the number of groups for which data is actively being transferred does not exceed the maximum number, beginning an active transfer of data for the selected group; and when the number of groups for which data is actively being transferred exceeds the maximum number, maintaining the selected group as a group queued for later processing.

19. The method of claim 16, wherein the computer system includes at least one migration vehicle that is capable of transferring data from at least one source storage resource to the at least one target storage resource, and wherein the act (A) comprises an act of communicating with the at least one migration vehicle to begin the active transfer of data for each of the first set of the plurality of groups.

20. The method of claim 16, wherein the data set comprises a set of logically related data.

21. A method of initiating a migration of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources, the method comprising acts of:

(A) beginning an active transfer of data, for each of a first set of the plurality of groups, from the source storage resource to the at least one target storage resource;

(B) queuing, for later processing, a second set of the plurality of groups, so that an active transfer of data for the second set of the plurality of groups is not begun at a same time as for the first set of the plurality of groups; and (C) initially processing each of the plurality of groups, including;

determining, at a time a selected group is processed, whether at least one selection criterion is met to enable active data transfer for the selected pair to begin;

when the at least one selection criterion is met, including the selected group in the first set for which active transfer is begun in the act (A); and when the at least one selection criterion is not met, including the selected group in the second set that is queued in the act (B).

22. The method of claim 21, further comprising an act (D), executed subsequent to acts (A)-(C), of re-processing the second set of the plurality of groups queued in the act (B), including beginning an active transfer of data for at least one of the groups in the second set.

23. The method of claim 21, further comprising an act (D), executed subsequent to acts (A)-(C), of re-processing the second set of the plurality of groups queued in the act (B), the act (D) comprising acts of:

determining, at a time a selected group is re-processed, whether at least one selection criterion is met to enable active data transfer for the selected group to begin;

when the at least one selection criterion is met, beginning an active transfer of data for the selected group; and when the at least one selection criterion is not met, maintaining the selected group as a group queued for later processing.

24. The method of claim 23, wherein the act (D) is performed repeatedly until active transfer has been begun for each of the plurality of groups.

25. The method of claim 23, wherein the act (D) is performed in response to expiration of a period of time subsequent to execution of the act (C).

26. The method of claim 23, wherein the act (D) is performed in response to completion of an active transfer of data for one of the first set of the plurality of groups.

27. An apparatus for migrating a data set from a plurality of source storage resources in at least one source storage system to a plurality of target storage resources in at least one target storage system, wherein each one of the source storage resources forms a group with a corresponding at least one target storage resource to which data on the one of the source storage resources will be migrated, and wherein the migration involves a plurality of groups of source and target storage resources, the apparatus comprising:

at least one processor that is programmed to;

begin an active transfer of data, for each of a first set of the plurality of groups, from the source storage resource and the source storage system to at least one intermediary entity, and from the at least one intermediary entity to the at least one target storage resource; and queue, for later processing, a second set of the plurality of groups, so that an active transfer of data for the second set of the plurality of groups is not begun at a same time as for the first set of the plurality of groups;

wherein the at least one intermediary entity comprises at least one component separate from the at least one source storage system and at least one target storage system.

28. The apparatus of claim 27, wherein the at least one processor is further programmed to:

determine, at a time a selected group is processed, whether a number of groups for which data is actively being transferred exceeds a maximum number;

when the number of groups for which data is actively being transferred does not exceed the maximum number, include the selected group in the first set for which active transfer is begun; and when the number of groups for which data is actively being transferred exceeds the maximum number, include the selected group in the second set that is queued.

29. The apparatus of claim 28, wherein the at least one processor is further programmed to subsequently re-process the second set of the plurality of groups queued by:

determining, at a time a selected group is re-processed, whether a number of groups for which data is actively being transferred exceeds a maximum number;

when the number of groups for which data is actively being transferred does not exceed the maximum number, beginning an active transfer of data for the selected group; and when the number of groups for which data is actively being transferred exceeds the maximum number, maintaining the selected group as a group queued for later processing.

30. The apparatus of claim 27, wherein the computer system includes at least one migration vehicle that is capable of transferring data from at least one source storage resource to the at least one target storage resource, and wherein the at least one processor is further programmed to communicate with the at least one migration vehicle to begin the active transfer of data for each of the first set of the plurality of groups.

31. The apparatus of claim 27, wherein the data set comprises a set of logically related data.

32. An apparatus for migrating a data set from a plurality of source storage resources to a plurality of target storage resources, wherein each one of the source storage resources forms a group with a corresponding at least one target storage resource to which data on the one of the source storage resources will be migrated, and wherein the migration involves a plurality of groups of source and target storage resources, the apparatus comprising:

at least one processor that is programmed to:
begin an active transfer of data, for each of a first set of the plurality of groups, from the source storage resource to the at least one target storage resource;
queue, for later processing, a second set of the plurality of groups, so that an active transfer of data for the second set of the plurality of groups is not begun at a same time as for the first set of the plurality of groups,
determine, at a time a selected group is processed, whether at least one selection criterion is met to enable active data transfer for the selected pair to begin;
when the at least one selection criterion is met, include the selected group in the first set for which active transfer is begun; and
when the at least one selection criterion is not met, include the selected group in the second set.

33. The apparatus of claim 32, wherein the at least one processor is further programmed to subsequently re-process the second set of the plurality of groups queued and begin an active transfer of data for at least one of the groups in the second set.

34. The apparatus of claim 32, wherein the at least one processor is further programmed to subsequently re-process the second set of the plurality of groups queued by:

determining, at a time a selected group is re-processed, whether at least one selection criterion is met to enable active data transfer for the selected group to begin;
when the at least one selection criterion is met, beginning an active transfer of data for the selected group; and
when the at least one selection criterion is not met, maintaining the selected group as a group queued for later processing.

35. The apparatus of claim 34, wherein the at least one processor is further programmed to re-process the second set repeatedly until active transfer has been begun for each of the plurality of groups.

36. The apparatus of claim 34, wherein the at least one processor is further programmed to perform the subsequent re-processing in response to an expiration of a period of time.

37. The apparatus of claim 34, wherein the at least one processor is further programmed to perform the subsequent re-processing in response to completion of an active transfer of data for one of the first set of the plurality of groups.

38. A computer-readable medium having instructions recorded thereon that, when executed, perform a method comprising initiating a move of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources, the method comprising acts of:

(A) beginning an active transfer of data, for each of a first set of the plurality of groups, from the source storage resource to the at least one target storage resource; and
(B) queuing, for later processing, a second set of the plurality of groups, so that an active transfer of data for the second set of the plurality of groups is not begun at a same time as for the first set of the plurality of groups.

39. The computer-readable medium of claim 38, wherein the method further comprises an act (C) of initially processing each of the plurality of groups, including;

determining, at a time a selected group is processed, whether a number of groups for which data is actively being transferred exceeds a maximum number;
when the number of groups for which data is actively being transferred does not exceed the maximum number, including the selected group in the first set for which active transfer is begun in the act (A); and
when the number of groups for which data is actively being transferred exceeds the maximum number, including the selected group in the second set that is queued in the act (B).

40. The computer-readable medium of claim 39, wherein the method further comprises instructions defining performing an act (D), subsequent to acts (A)-(C), of re-processing the second set of the plurality of groups queued in the act (B), the act (D) comprising acts of:

determining, at a time a selected group is re-processed, whether a number of groups for which data is actively being transferred exceeds a maximum number;
when the number of groups for which data is actively being transferred does not exceed the maximum number, beginning an active transfer of data for the selected group; and
when the number of groups for which data is actively being transferred exceeds the maximum number, maintaining the selected group as a group queued for later processing.

41. The computer-readable medium of claim 38, wherein the computer system includes at least one migration vehicle that is capable of transferring data from at least one source storage resource to the at least one target storage resource, and wherein the act (A) comprises an act of communicating with the at least one migration vehicle to begin the active transfer of data for each of the first set of the plurality of groups.

42. A computer-readable medium having instructions recorded thereon that, when executed, perform a method comprising initiating a migration of a data set from a plurality of source storage resources to a plurality of target storage resources, each one of the source storage resources forming a group with a corresponding at least one target storage resource to which data on the one of the source storage resources will be migrated, the migration involving a plurality of groups of source and target storage resources, the method comprising acts of:
- (A) beginning an active transfer of data, for each of a first set of the plurality of groups, from the source storage resource to the at least one target storage resource; and
- (B) queuing, for later processing, a second set of the plurality of groups, so that an active transfer of data for the second set of the plurality of groups is not begun at a same time as for the first set of the plurality of groups;
- (C) initially processing each of the plurality of groups, including;
  - determining, at a time a selected group is processed, whether at least one selection criterion is met to enable active data transfer for the selected pair to begin;
  - when the at least one selection criterion is met, including the selected group in the first set for which active transfer is begun in the act (A); and
  - when the at least one selection criterion is not met, including the selected group in the second set that is queued in the act (B).

43. The computer-readable medium of claim 42, wherein the method further comprises instructions defining performing an act (D), executed subsequent to acts (A)-(C), of re-processing the second set of the plurality of groups queued in the act (B), including beginning an active transfer of data for at least one of the groups in the second set.

44. The computer-readable medium of claim 42, wherein the method further comprises instructions defining performing an act (D), executed subsequent to acts (A)-(C), of re-processing the second set of the plurality of groups queued in the act (B), the act (D) comprising acts of:
- determining, at a time a selected group is re-processed, whether at least one selection criterion is met to enable active data transfer for the selected group to begin;
- when the at least one selection criterion is met, beginning an active transfer of data for the selected group; and
- when the at least one selection criterion is not met, maintaining the selected group as a group queued for later processing.

45. The computer-readable medium of claim 44, wherein the act (D) is performed repeatedly until active transfer has been begun for each of the plurality of groups.

46. The computer-readable medium of claim 44, wherein the act (D) is performed in response to expiration of a period of time subsequent to execution of the act (C).

47. The computer-readable medium of claim 44, wherein the act (D) is performed in response to completion of an active transfer of data for one of the first set of the plurality of groups.

* * * * *